US012596445B2

(12) United States Patent
Ku et al.

(10) Patent No.: US 12,596,445 B2
(45) Date of Patent: Apr. 7, 2026

(54) DISPLAY DEVICE AND METHOD OF DRIVING THE SAME

(71) Applicant: Samsung Display Co., Ltd., Yongin-Si (KR)

(72) Inventors: Kyo Won Ku, Yongin-si (KR); Jin A Kang, Yongin-si (KR); Ga Young Kim, Yongin-si (KR); Mi Young Kim, Yongin-si (KR); Sang Hyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 129 days.

(21) Appl. No.: 18/444,763

(22) Filed: Feb. 19, 2024

(65) Prior Publication Data

US 2024/0393894 A1 Nov. 28, 2024

(30) Foreign Application Priority Data

May 22, 2023 (KR) ........................ 10-2023-0065833

(51) Int. Cl.
  *G06F 3/041* (2006.01)
  *G06F 3/0354* (2013.01)
  *G06F 3/044* (2006.01)
  *G06F 3/046* (2006.01)
  *H02J 50/05* (2016.01)

(52) U.S. Cl.
  CPC ........ *G06F 3/0412* (2013.01); *G06F 3/03545* (2013.01); *G06F 3/0446* (2019.05); *G06F 3/046* (2013.01); *H02J 50/05* (2016.02)

(58) Field of Classification Search
  CPC .. G06F 3/03545; G06F 3/0412; G06F 3/0416; G06F 3/04166; G06F 3/044; G06F 3/0443; G06F 3/0446; G06F 3/046; G09G 3/20; H02J 50/05
  See application file for complete search history.

(56) References Cited

U.S. PATENT DOCUMENTS

| | | | |
|---|---|---|---|
| 10,606,389 B2 | 3/2020 | Ju et al. | |
| 2018/0307368 A1* | 10/2018 | Koide | ..................... H10D 86/60 |
| 2020/0192516 A1* | 6/2020 | Ju | ........................... G06F 3/041 |
| 2022/0206663 A1* | 6/2022 | Kim | ..................... G06F 3/0412 |

FOREIGN PATENT DOCUMENTS

KR 10-2324210 B1 11/2021

* cited by examiner

*Primary Examiner* — Nelson M Rosario
(74) *Attorney, Agent, or Firm* — Innovation Counsel LLP

(57) ABSTRACT

A display device includes a display panel including sub-pixels, a display panel driver configured to control the display panel, a touch panel including a touch sensor including a plurality of touch electrodes and a charger including a plurality of charge electrodes, and a touch panel driver configured to provide a first charge voltage having a first phase to N first charge electrodes among the charge electrodes in a first charge period, and provide the first charge voltage to M (M is different from N) second charge electrode among the charge electrodes in a second charge period.

21 Claims, 19 Drawing Sheets

Touch Sensor

211

Charger

220

Touch Panel Driver

110

Display Panel

120

Display Panel Driver

211

PCA

OA1                                                     CA

E_RX1

E_RX2

E_RX3

E_RX4

E_RX5

E_RX6

E_RX7

E_RX8

E_RX9

E_TX1   E_TX2   E_TX3   E_TX4   E_TX5   E_TX6   E_TX7   E_TX8   E_TX9

D1

D2

212

PTA

OA2

TA

T_RX1

T_RX2

T_RX3

T_RX4

T_RX5

T_RX6

T_RX7

T_RX8

T_RX9

T_TX1   T_TX2   T_TX3   T_TX4   T_TX5   T_TX6   T_TX7   T_TX8   T_TX9

D1

D2

211

PCA

CA

OA2

PCA

DISPLAY DEVICE AND METHOD OF DRIVING THE SAME

This application claims priority to Korean Patent Application No. 10-2023-0065833, filed on May 22, 2023, and all the benefits accruing therefrom under 35 U.S.C. § 119, the content of which in its entirety is herein incorporated by reference.

BACKGROUND

1. Field

The disclosure relates to a display device and a method of driving the same, and more particularly, to a display device recognizing a touch and a method of driving the same.

2. Description of the Related Art

An electronic device equipped with a touch panel and having a function of indicating a position by a touch is widely used. In particular, as spread of a mobile electronic device such as a smart phone or a tablet computer, a touch sensor is widely used. Recently, demand for a technology for recognizing a touch on the touch panel using another tool such as a stylus pen as well as a finger is increasing.

A method of recognizing the touch of the stylus pen includes a pressure-sensitive method, an infrared method, a capacitive method, an electromagnetic resonance (EMR) method, and the like. In a case of the EMR method, a magnetic field is required to be formed in all areas of the touch panel to sense and charge the stylus pen.

The touch panel may form the magnetic field in all areas through time-division driving. However, in a case of the time-division driving, a problem in that a scan rate (report rate) of the touch panel is lowered exists.

SUMMARY

An object of the disclosure is to provide a display device capable of increasing a scan rate of a touch panel.

Another object of the disclosure is to provide a method of driving a display device.

Still another object of the disclosure is to provide a display device improving touch sensitivity at an edge portion of a touch panel.

In order to achieve the object of the disclosure, according to embodiments of the disclosure, a display device may include a display panel including sub-pixels, a display panel driver configured to control the display panel, a touch panel including a touch sensor including a plurality of touch electrodes and a charger including a plurality of charge electrodes, and a touch panel driver configured to provide a first charge voltage having a first phase to N first charge electrodes among the charge electrodes in a first charge period and provide the first charge voltage to M (M is different from N) second charge electrode among the charge electrodes in a second charge period, where N is a positive integer greater than or equal to 2 and M is a positive integer.

In an embodiment, the touch panel driver may provide a second charge voltage having a second phase different from the first phase to a third charge electrode among the charge electrodes in the first charge period and provide the second charge voltage to a fourth charge electrode among the charge electrodes in the second charge period.

In an embodiment, the first charge period and the second charge period may be alternately repeated.

In an embodiment, a first portion of the first charge electrodes may be disposed adjacent to the third charge electrode in a first direction and a second portion of the first charge electrodes may be disposed adjacent to the third charge electrodes in a direction opposite to the first direction.

In an embodiment, the third charge electrode may be disposed between the second charge electrode and the fourth charge electrode.

In an embodiment, a minimum distance between the second charge electrodes and the fourth charge electrode may be different from a minimum distance between the first charge electrodes and the third charge electrode.

In an embodiment, the touch panel driver may provide a touch driving signal to the touch sensor in a first touch period and provide the first charge voltage and the second charge voltage to the charger in a second touch period.

In an embodiment, the touch panel driver may not provide the touch driving signal to the touch sensor in the second touch period.

In an embodiment, the second touch period may include the first charge period, the second charge period, and a discharge period, and the discharge period may be disposed between the first charge period and the second charge period.

In an embodiment, the touch panel driver may not provide the first charge voltage and the second charge voltage to the charge electrodes in the discharge period.

In an embodiment, the display panel may include a display area including the sub-pixels, and a first peripheral area disposed adjacent to the display area, the charger may include a charge area including the charge electrodes, and a second peripheral area disposed adjacent to the charge area, and the first peripheral area may overlap the second peripheral area in a plan view.

In an embodiment, the charger may further include a dummy charge electrode disposed in the second peripheral area.

In an embodiment, the touch panel driver may provide the first charge voltage to the dummy charge electrode in at least one of the first charge period and the second charge period.

In an embodiment, the touch electrodes may include a first touch electrode extending in a first direction, and a second touch electrode extending in a second direction crossing the first direction, and the charge electrodes may extend in the first direction.

In an embodiment, the touch panel may further include a first capacitor including a first electrode connected to the first touch electrode and a second electrode connected to at least one of the charge electrodes.

In an embodiment, the charger may further include auxiliary electrodes extending in the second direction, and the touch panel may further include a second capacitor including a first electrode connected to the second touch electrode and a second electrode connected to at least one of the auxiliary electrodes.

In order to achieve the another object of the disclosure, according to embodiments of the disclosure, a display device may include a display panel including sub-pixels, a display panel driver configured to control the display panel, a touch panel including a touch sensor including a plurality of touch electrodes and a charger including a plurality of charge electrodes, and a touch panel driver configured to provide a first charge voltage having a first phase to a first charge electrode among the charge electrodes in a first charge period, provide the first charge voltage to a second charge electrode among the charge electrodes in a second charge period, provide a second charge voltage having a second phase different from the first phase to a third charge electrode among the charge electrodes in the first charge period, and provide the second charge voltage to a fourth charge electrode among the charge electrodes in the second charge period, and a minimum distance between the second charge electrode and the fourth charge electrode may be different from a minimum distance between the first charge electrode and the third charge electrode.

In order to achieve another object of the disclosure, according to embodiments of the disclosure, a method of driving a display device may include providing a first charge voltage having a first phase to N first charge electrodes among charge electrodes in a first charge period, providing a second charge voltage having a second phase different from the first phase to a third charge electrode among the charge electrodes in the first charge period, providing the first charge voltage to M (M is different from N) second charge electrode among the charge electrodes in a second charge period, and providing the second charge voltage to a fourth charge electrode among the charge electrodes in the second charge period, where N is a positive integer greater than or equal to 2 and M is a positive integer.

In an embodiment, a minimum distance between the second charge electrodes and the fourth charge electrode may be different from a minimum distance between the first charge electrodes and the third charge electrode.

In an embodiment, the method may further include providing a touch driving signal to a touch sensor in a first touch period.

In order to achieve the still another object of the disclosure, according to embodiments of the disclosure, a display device may include a display panel including sub-pixels, a display panel driver configured to control the display panel, a touch panel including a touch sensor including a plurality of touch electrodes and a charger including a plurality of charge electrodes, and a touch panel driver configured to provide a first charge voltage having a first phase to a first charge electrode among the charge electrodes in a first charge period, provide the first charge voltage to a second charge electrode among the charge electrodes in a second charge period, provide a second charge voltage having a second phase different from the first phase to a third charge electrode among the charge electrodes in the first charge period, and provide the second charge voltage to a fourth charge electrode among the charge electrodes in the second charge period, and the charger may include a charge area including the charge electrode, a peripheral area disposed adjacent to the charge area, and a dummy charge electrode disposed in the peripheral area.

The display device according to embodiments of the disclosure may include the touch panel including the touch sensor to sense a touch of a finger through a capacitive method and the charger to sense a touch of a stylus pen through an electromagnetic resonance method.

The display device according to embodiments of the disclosure may increase a scan rate of the touch panel by varying the number of charge electrodes to which a charge voltage is provided.

The display device according to embodiments of the disclosure may increase a scan rate of the touch panel by varying a distance between the charge electrodes to which charge voltages of different phases are applied.

The display device according to embodiments of the disclosure may include the dummy charge electrode to improve touch sensitivity of an edge portion of the touch panel.

However, an effect of the disclosure is not limited to the above-described effect, and may be variously expanded within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings, in which:

FIG. 1 is a diagram illustrating a display device according to embodiments of the disclosure;

FIG. 17 is a diagram illustrating an example of capacitors between the charger and the touch sensor of FIG. 1;

DETAILED DESCRIPTION OF THE EMBODIMENT

Figure 2:
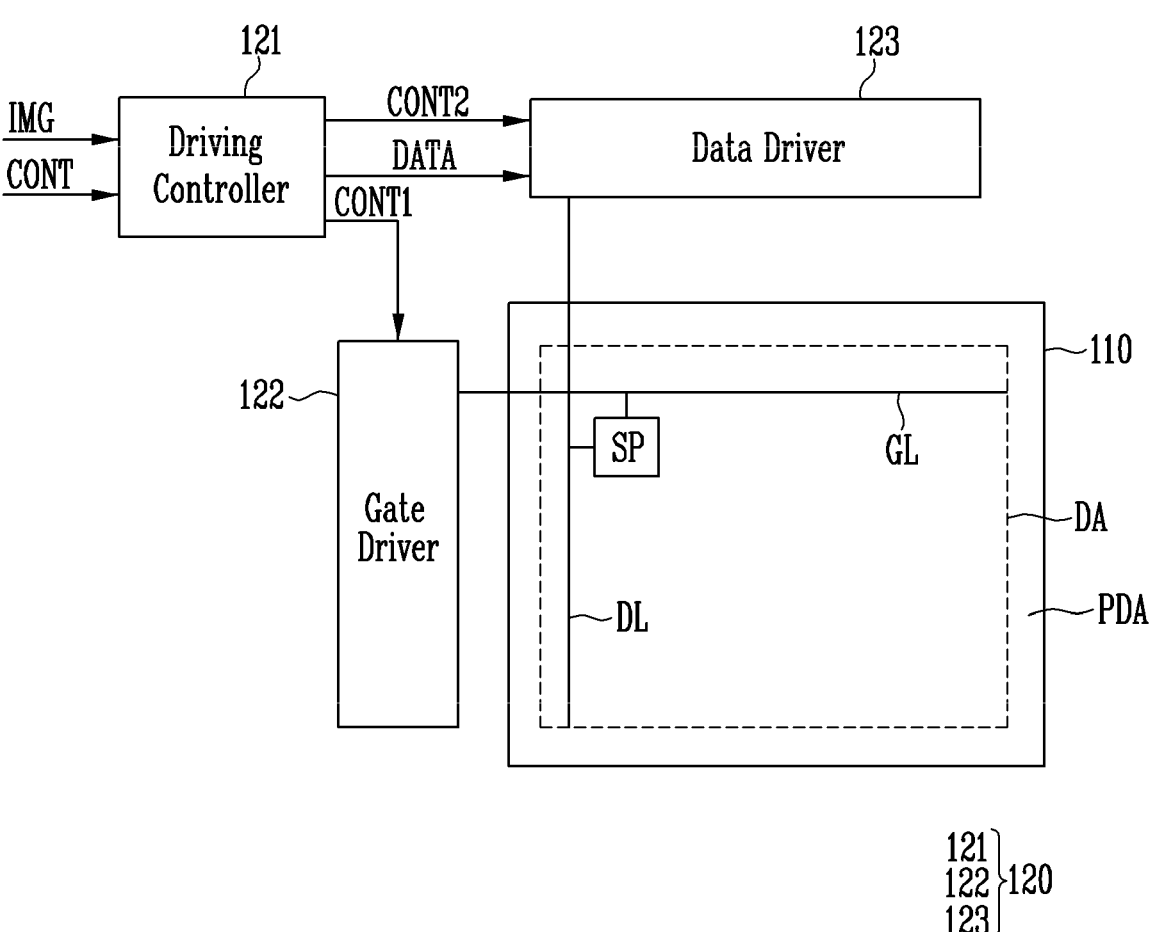
FIG. 2 is a block diagram illustrating an example of a display panel and a display panel driver of the display device of FIG. 1.

Hereinafter, a preferred embodiment according to the disclosure is described in detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiment described herein. However, the embodiment described herein is provided to describe in detail enough to easily implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

Figure 1:
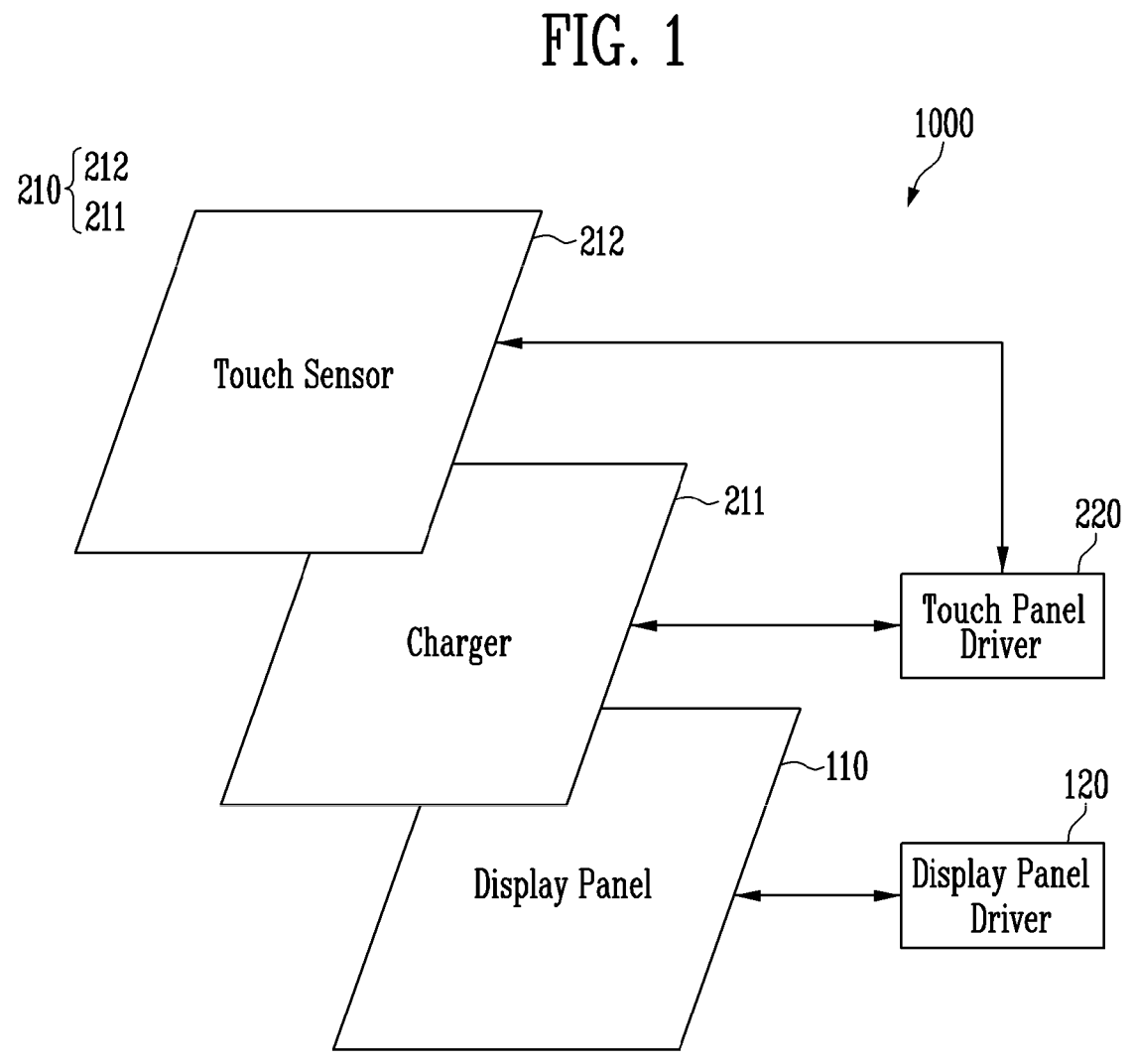
Figure 3:
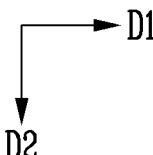
FIG. 3 is a diagram illustrating an example of a charger of FIG. 1.
Figure 4:
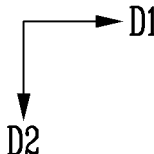
FIG. 4 is a diagram illustrating an example of a touch sensor of FIG. 1.

FIG. 1 is a diagram illustrating a display device 1000 according to embodiments of the disclosure, FIG. 2 is a block diagram illustrating an example of a display panel 110 and a display panel driver 120 of the display device 1000 of FIG. 1, FIG. 3 is a diagram illustrating an example of a charger 211 of FIG. 1, and FIG. 4 is a diagram illustrating an example of a touch sensor 212 of FIG. 1.

Referring to FIG. 1, the display device 1000 may include the display panel 110, the display panel driver 120, a touch panel 210, and a touch panel driver 220. A detailed description of this is given later.

FIG. 1 illustrates the touch panel 210 and the display panel 110 separated from each other. However, this is only for functionally separating the touch panel 210 and the display panel 110 in the display device 1000. For example, the touch panel 210 may be formed in a process separate from the display panel 110, and the touch panel 210 and the display panel 110 may be coupled to each other (for example, the touch panel 210 may be attached and coupled to one surface of the display panel 110). As described above, the touch panel 210 may be formed as an add-on type. Alternatively, the touch panel 210 and the display panel 110 may be formed in one process (for example, a process of manufacturing the display panel 110). As described above, the touch panel 210 may be formed in an in-cell type.

The touch panel 210 may include the charger 211 and the touch sensor 212. A detailed description of this is given later.

FIG. 1 illustrates the charger 211 and the touch sensor 212 separated from each other. However, this is only for functionally separating the charger 211 and the touch sensor 212 in the display device 1000. For example, the charger 211 may be formed in a process separate from the touch sensor 212, and the charger 211 and the touch sensor 212 may be coupled to each other (for example, the touch sensor 212 may be attached and coupled to one surface of the charger 211). Alternatively, the touch sensor 212 and the charger 211 may be formed in one process (for example, a process of manufacturing the charger 211).

In the present embodiment, it is exemplified that the charger 211 is disposed on a lower surface of the touch sensor 212, but the disclosure is not limited thereto. For example, the charger 211 may be disposed on an upper surface of the touch sensor 212. For example, the charger 211 may be disposed on the same layer as the touch sensor 212. In this case, charge electrodes and touch electrodes described later may be insulated from each other by an insulating layer disposed therebetween.

The touch panel 210 may be provided on one surface of the display panel 110. For example, the touch panel 210 may be disposed on one surface (for example, an upper surface) of the display panel 110 through which an image is emitted. In another embodiment, the touch panel 210 may be directly formed on at least one of both surfaces of the display panel 110 or may be formed inside the display panel 110. For example, the touch panel 210 may be directly formed on an upper surface of the upper substrate or a lower surface of the lower substrate, or may be directly formed on a lower surface of the upper substrate or an upper surface of the lower substrate.

Referring to FIGS. 1 and 2, the display device 1000 may include the display panel 110 and the display panel driver 120. The display panel driver 120 may include a driving controller 121, a gate driver 122, and a data driver 123. In an embodiment, the driving controller 121 and the data driver 123 may be integrated into one chip.

The display panel 110 may include a display area DA displaying an image and a first peripheral area PDA disposed adjacent to the display area DA. In an embodiment, the gate driver 122 may be mounted on the first peripheral area PDA of the display panel 110.

The display panel 110 may include a plurality of gate lines GL, a plurality of data lines DL, and a plurality of sub-pixels SP electrically connected to the gate lines GL and the data lines DL. The gate lines GL may extend in a direction crossing the data lines DL.

The driving controller 121 may receive input image data IMG and an input control signal CONT from a main processor (for example, a graphic processing unit (GPU)). For example, the input image data IMG may include red image data, green image data, and blue image data. In an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 121 may generate a first control signal CONT1, a second control signal CONT2, and a data signal DATA based on the input image data IMG and the input control signal CONT.

The driving controller 121 may generate the first control signal CONT1 for controlling an operation of the gate driver 122 based on the input control signal CONT and output the first control signal CONT1 to the gate driver 122. The first control signal CONT1 may include a vertical start signal and a gate clock signal.

The driving controller 121 may generate the second control signal CONT2 for controlling an operation of the data driver 123 based on the input control signal CONT and output the second control signal CONT2 to the data driver 123. The second control signal CONT2 may include a horizontal start signal and a load signal.

The driving controller 121 may generate the data signal DATA by receiving the input image data IMG and the input control signal CONT. The driving controller 121 may output the data signal DATA to the data driver 123.

The gate driver 122 may generate gate signals for driving the gate lines GL in response to the first control signal CONT1 received from the driving controller 121. The gate driver 122 may output the gate signals to the gate lines GL. For example, the gate driver 122 may sequentially output the gate signals to the gate lines GL.

The data driver 123 may receive the second control signal CONT2 and the data signal DATA from the driving controller 121. The data driver 123 may generate data voltages obtained by converting the data signal DATA into an analog voltage. The data driver 123 may output the data voltages to the data line DL.

Referring to FIGS. 1 to 3, the charger 211 may include a plurality of charge electrodes E_TX1, E_TX2, . . . , and E_TX9 and a plurality of auxiliary electrodes E_RX1, E_RX2, . . . , and E_RX9.

The charge electrodes E_TX1, E_TX2, . . . , and E_TX9 may extend in a second direction D2. The auxiliary electrodes E_RX1, E_RX2, . . . , and E_RX9 may extend in a first direction D1 crossing the second direction D2. The auxiliary electrodes E_RX1, E_RX2, . . . , and E_RX9 may be insulated from the charge electrodes E_TX1, jE_TX2, . . . , and E_TX9 by an insulating layer which is not shown.

The charge electrodes E_TX1, E_TX2, . . . , and E_TX9 and the auxiliary electrodes E_RX1, E_RX2, . . . , and E_RX9 may be disposed to overlap each other in a first overlap area OA1. A capacitor may be formed in the first overlap area OA1. For example, the capacitor may include a first electrode connected to the charge electrodes E_TX1, E_TX2, . . . , and E_TX9, a second electrode connected to the auxiliary electrodes E_RX1, E_RX2, . . . , and E_RX9, and an insulating layer disposed therebetween.

The charger 211 may include a charge area CA including the charge electrodes E_TX1, E_TX2, . . . , and E_TX9 and a second peripheral area PCA disposed adjacent to the charge area CA.

For example, the charge area CA may overlap the display area DA of the display panel 110. For example, the second peripheral area PCA may overlap the first peripheral area PDA of the display panel 110.

In the present embodiment, each of the charge electrodes E_TX1, E_TX2, . . . , and E_TX9 and the auxiliary electrodes E_RX1, E_RX2, . . . , and E_RX9 includes nine electrodes as an example, but the disclosure is not limited to the number of charge electrodes E_TX1, E_TX2, . . . , and E_TX9 and auxiliary electrodes E_RX1, E_RX2, . . . , and E_RX9.

Referring to FIGS. 1, 2, and 4, the touch sensor 212 may include a plurality of touch electrodes T_TX1, T_TX2, . . . , T_TX9, T_RX1, T_RX2, . . . , and T_RX9. The touch electrodes T_TX1, T_TX2, . . . , T_TX9, T_RX1, T_RX2, . . . , and T_RX9 may include first touch electrodes T_TX1, T_TX2, . . . , and T_TX9 extending in the second direction D2 and second touch electrodes T_RX1, T_RX2, . . . , and T_RX9 extending in the first direction D1 crossing the second direction D2. The second touch electrodes T_RX1, T_RX2, . . . , and T_RX9 may be insulated from the first touch electrodes T_TX1, T_TX2, . . . , and T_TX9 by an insulating layer which is not shown.

The first touch electrodes T_TX1, T_TX2, . . . , and T_TX9 and the second touch electrodes T_RX1, T_RX2, . . . , and T_RX9 may be disposed to overlap each other in a second overlap area OA2. A capacitor (hereinafter referred to as a touch capacitor) may be formed in the second overlap area OA2. For example, the touch capacitor may include a first electrode connected to the first touch electrodes T_TX1, T_TX2, . . . , and T_TX9, a second electrode connected to the second touch electrodes T_RX1, T_RX2, . . . , and T_RX9, and an insulating layer disposed therebetween.

The touch sensor 212 may include a touch area TA including the first touch electrodes T_TX1, T_TX2, . . . , and T_TX9 and a third peripheral area PTA disposed adjacent to the touch area TA.

For example, the touch area TA may overlap the display area DA of the display panel 110. For example, the third peripheral area PTA may overlap the first peripheral area PDA of the display panel 110.

In an embodiment, the touch area TA may overlap the charge area CA of the charger 211 in a plan view. The first touch electrodes T_TX1, T_TX2, . . . , and T_TX9 may overlap the charge electrodes E_TX1, E_TX2, . . . , and E_TX9 in the plan view. The second touch electrodes T_RX1, T_RX2, . . . , and T_RX9 may overlap the auxiliary electrodes E_RX1, E_RX2, . . . , and E_RX9 in the plan view.

In the present embodiment, each of the first touch electrodes T_TX1, T_TX2, . . . , and T_TX9 and the second touch electrodes T_RX1, T_RX2, . . . , and T_RX9 includes nine electrodes as an example, but the disclosure is not limited to the number of charge electrodes E_TX1, E_TX2, . . . , and E_TX9 and auxiliary electrodes E_RX1, E_RX2, . . . , and E_RX9.

Figure 5:
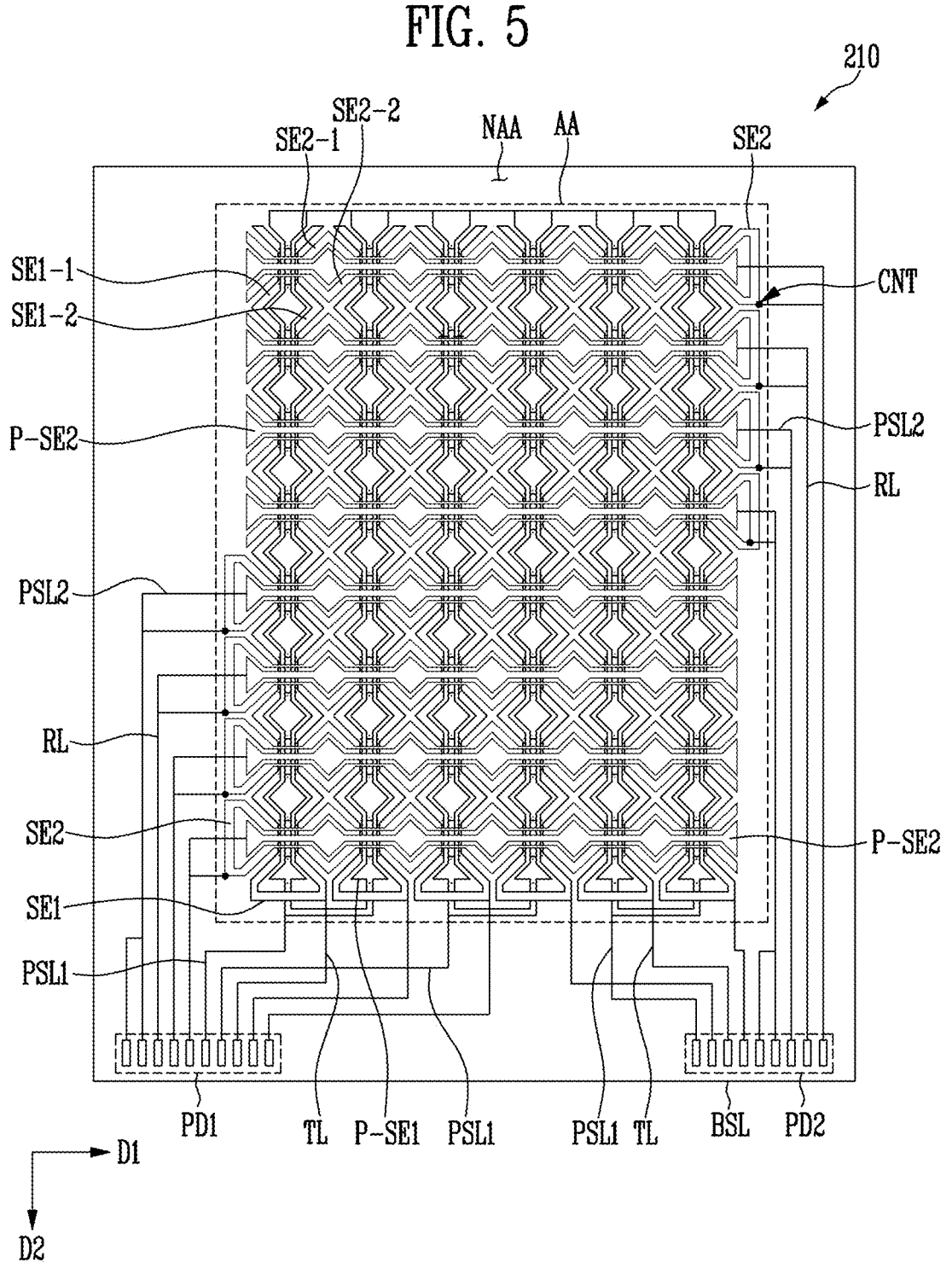
FIG. 5 is a plan view illustrating an example in which the charger and the touch sensor of the display device of FIG. 1 are integrally formed.

FIG. 5 is a plan view illustrating an example in which the charger 211 and the touch sensor 212 of the display device 1000 of FIG. 1 are integrally formed.

Referring to FIG. 5, the touch panel 210 may include a base layer BSL, a plurality of touch electrodes SE1 and SE2, a plurality of touch lines TL and RL, a plurality of charge electrodes P-SE1, a plurality of auxiliary electrodes P-SE2, a plurality of charge lines PSL1 and PSL2, a plurality of first pads PD1, and a plurality of second pads PD2.

An active area AA and a peripheral area NAA disposed adjacent to the active area AA may be defined in the base layer BSL. In a plan view, the active area AA may overlap the display area DA of FIG. 2, the charge area CA of FIG. 3, and/or the touch area TA of FIG. 4, and the peripheral area NAA may overlap the first peripheral area PDA of FIG. 2, the second peripheral area PCA of FIG. 3, and/or the third peripheral area PTA of FIG. 4.

The plurality of touch electrodes SE1 and SE2 may be disposed in the active area AA, and the first and second pads PD1 and PD2 may be disposed in the peripheral area NAA. The first pads PD1 and the second pads PD2 may be disposed adjacent to a lower end of the touch panel 210 in a plan view.

Exemplarily, the first pads PD1 may be disposed adjacent to one corner disposed lower left side of the touch panel 210, and the second pads PD2 may be disposed adjacent to one corner disposed lower right side of the touch panel 210.

Although FIG. 5 illustrates that the first pads PD1 and the second pads PD2 are formed on the base layer BSL, a disposition relationship of the first pads PD1 and the second pads PD2 according to an embodiment of the disclosure is not limited thereto. For example, the first pads PD1 and the second pads PD2 may be disposed to be spaced apart from each other in the first peripheral area PDA of the display panel 110 of FIG. 2, and may be electrically connected to the touch panel 210 by a contact hole.

The touch electrodes SE1 and SE2 may include a plurality of first touch electrodes SE1 extending in the second direction D2 and arranged in the first direction D1, and a plurality of second touch electrodes SE2 extending in the first direction D1 and arranged in the second direction D2. The second touch electrodes SE2 may extend to be insulated from and cross the first touch electrodes SE1.

The touch lines TL and RL may be respectively connected to ends of the first and second touch electrodes SE1 and SE2, may extend to the peripheral area NAA, and may be respectively connected to the first and second pads PD1 and PD2. The touch lines TL and RL may include a plurality of first touch lines TL respectively connected to the first touch electrodes SE1, and a plurality of second touch lines RL respectively connected to the second touch electrodes SE2.

The first touch lines TL may be connected to lower ends of the first touch electrodes SE1. The first touch lines TL may extend to the peripheral area NAA, and may be connected to corresponding first and second pads PD1 and PD2, respectively.

First touch lines TL connected to a first portion of the first touch electrodes SE1 may be connected to corresponding first pads PD1. First touch lines TL connected to a second portion of the first touch electrodes SE1 may be connected to corresponding second pads PD2.

The second touch lines RL may be connected to one end of the second touch electrodes SE2. For example, the second touch lines RL disposed on a right side of the active area AA may be connected to a right side of the second touch electrodes SE2 disposed on an upper portion of the active area AA, and the second touch lines RL disposed on a left side of the active area AA may be connected to a left side of the second touch electrodes SE2 disposed on a lower portion of the active area AA. The second touch lines RL may extend to the peripheral area NAA, and may be connected to corresponding first and second pads PD1 and PD2.

The second touch lines RL disposed on a left side of the active area AA may be respectively connected to corresponding first pads PD1. The second touch lines RL disposed on a right side of the active area AA may be respectively connected to corresponding second pads PD2.

Each of the first touch electrodes SE1 may include a (1-1)-th touch electrode SE1-1 and a (1-2)-th touch electrode SE1-2 extending in the second direction D2 and spaced apart in the first direction D1. The (1-1)-th touch electrode SE1-1 and the (1-2)-th touch electrode SE1-2 may have shapes symmetrical to each other in the first direction D1.

In each of the first touch electrodes SE1, a lower end of the (1-1)-th touch electrode SE1-1 and a lower end of the (1-2)-th touch electrode SE1-2 may be connected to a corresponding first touch line TL among the first touch lines TL. In each of the first touch electrodes SE1, an upper end of the (1-1)-th touch electrode SE1-1 and an upper end of the (1-2)-th touch electrode SE1-2 may not be connected to each other.

Each of the second touch electrodes SE2 may include a (2-1)-th touch electrode SE2-1 and a (2-2)-th touch electrode SE2-2 extending in the first direction D1 and spaced apart in the second direction D2. The (2-1)-th touch electrode SE2-1 and the (2-2)-th touch electrode SE2-2 may have shapes symmetrical to each other in the second direction D2.

One end of the (2-1)-th touch electrode SE2-1 and one end of the (2-2)-th touch electrode SE2-2 disposed on the upper portion of the active area AA may be connected to corresponding second touch lines RL disposed on the right side of the active area AA. Each of the second touch electrodes SE2 may be connected to a corresponding second touch line RL formed on a different layer through a contact hole CNT. The other end of the of the (2-1)-th touch electrode SE2-1 and the other end of the (2-2)-th touch electrode SE2-2 disposed on the upper portion of the active area AA may not be connected to each other.

One end of the (2-1)-th touch electrode SE2-1 and one end of the (2-2)-th touch electrode SE2-2 disposed on the lower portion of the active area AA may be connected to corresponding second touch lines RL disposed on the left portion of the active area AA. Each of the second touch electrodes SE2 may be connected to a corresponding second touch line RL formed on a different layer through the contact hole CNT. The other end of the (2-1)-th touch electrode SE2-1 and the other end of the (2-2)-th touch electrode SE2-2 disposed on the lower portion of the active area AA may not be connected to each other.

Exemplarily, in a plan view, the first touch lines TL may be disposed in the peripheral area NAA disposed adjacent to the active area AA in the second direction D2. In addition, in a plan view, the second touch lines RL may be disposed in the peripheral area NAA disposed adjacent the active area AA in the first direction D1 or the direction opposite to the first direction D1.

The charge electrodes P-SE1 and the auxiliary electrodes P-SE2 may be disposed in the active area AA. The charge lines PSL1 and PSL2 may be connected to the charge electrodes P-SE1 and the auxiliary electrodes P-SE2, may extend to the peripheral area NAA, and may be connected to corresponding first and second pads PD1 and PD2.

Although not shown, the touch panel driver 220 for controlling the touch panel 210 may be connected to the first and second pads PD1 and PD2 through a printed circuit board.

The charge electrodes P-SE1 may extend in the second direction D2 and may be arranged in the first direction D1. The auxiliary electrodes P-SE2 may extend in the first direction D1 and may be arranged in the second direction D2.

The auxiliary electrodes P-SE2 may extend to be insulated from and cross the charge electrodes P-SE1. The charge electrodes P-SE1 may extend to be insulated from and cross the second touch electrodes SE2. The auxiliary electrodes P-SE2 may extend to be insulated and cross the first touch electrodes SE1.

Each of the charge electrodes P-SE1 may be disposed between a (1-1)-th touch electrode SE1-1 and a (1-2)-th touch electrode SE1-2 of a corresponding first touch electrode SE1 among the first touch electrodes SE1. Each of the auxiliary electrodes P-SE2 may be disposed between a (2-1)-th touch electrode SE2-1 and a (2-2)-th touch electrode SE2-2 of a corresponding second touch electrode SE2 among the second touch electrodes SE2.

The charge electrodes P-SE1 may be disposed on the same layer as the first touch electrodes SE1. The auxiliary electrodes P-SE2 may be disposed on the same layer as the second touch electrodes SE2. All of the charge electrodes P-SE1, the first touch electrodes SE1, the auxiliary electrodes P-SE2, and the second touch electrodes SE2 may be disposed on the same layer.

Ends of the charge electrodes P-SE1 disposed on the upper portion of the active area AA may be connected to each other. Ends of the charge electrodes P-SE1 disposed adjacent to each other on the lower portion of the active area AA may be connected to each other to form a pair of charge electrodes. That is, ends of two adjacent charge electrodes P-SE1 disposed on the lower portion of the active area AA may be connected to each other.

The charge lines PSL1 and PSL2 may include a plurality of first charge lines PSL1 and a plurality of second charge lines PSL2. The first charge lines PSL1 may be connected to the pair of charge electrodes, respectively. The second charge lines PSL2 may be connected to the auxiliary electrodes P-SE2, respectively.

Ends of the auxiliary electrodes P-SE2 disposed on the lower portion of the active area AA may be connected to corresponding second charge lines PSL2 disposed on the left side of the active area AA. Ends of the auxiliary electrodes P-SE2 disposed on the lower portion of the active area AA on the right side of the active area AA may not be connected to each other. The second charge line PSL2 connected to the auxiliary electrodes P-SE2 disposed on the lower portion of the active area AA may be connected to corresponding first pads PD1.

Ends of the auxiliary electrodes P-SE2 disposed on the upper portion of the active area AA may be connected to corresponding second charge lines PSL2 disposed on the right side of the active area AA. Ends of the auxiliary electrodes P-SE2 disposed on the upper portion of the active area AA on the left side of the active area AA may not be connected to each other. The second charge line PSL2 connected to the auxiliary electrodes P-SE2 disposed on the upper portion of the active area AA may be connected to corresponding second pads PD2.

A pair of charge electrodes P-SE1 may be connected to a corresponding first charge line PSL1 among the first charge lines PSL1. Ends of the charge electrodes P-SE1 disposed on the upper portion of the active area AA may be connected to each other.

Figure 6:
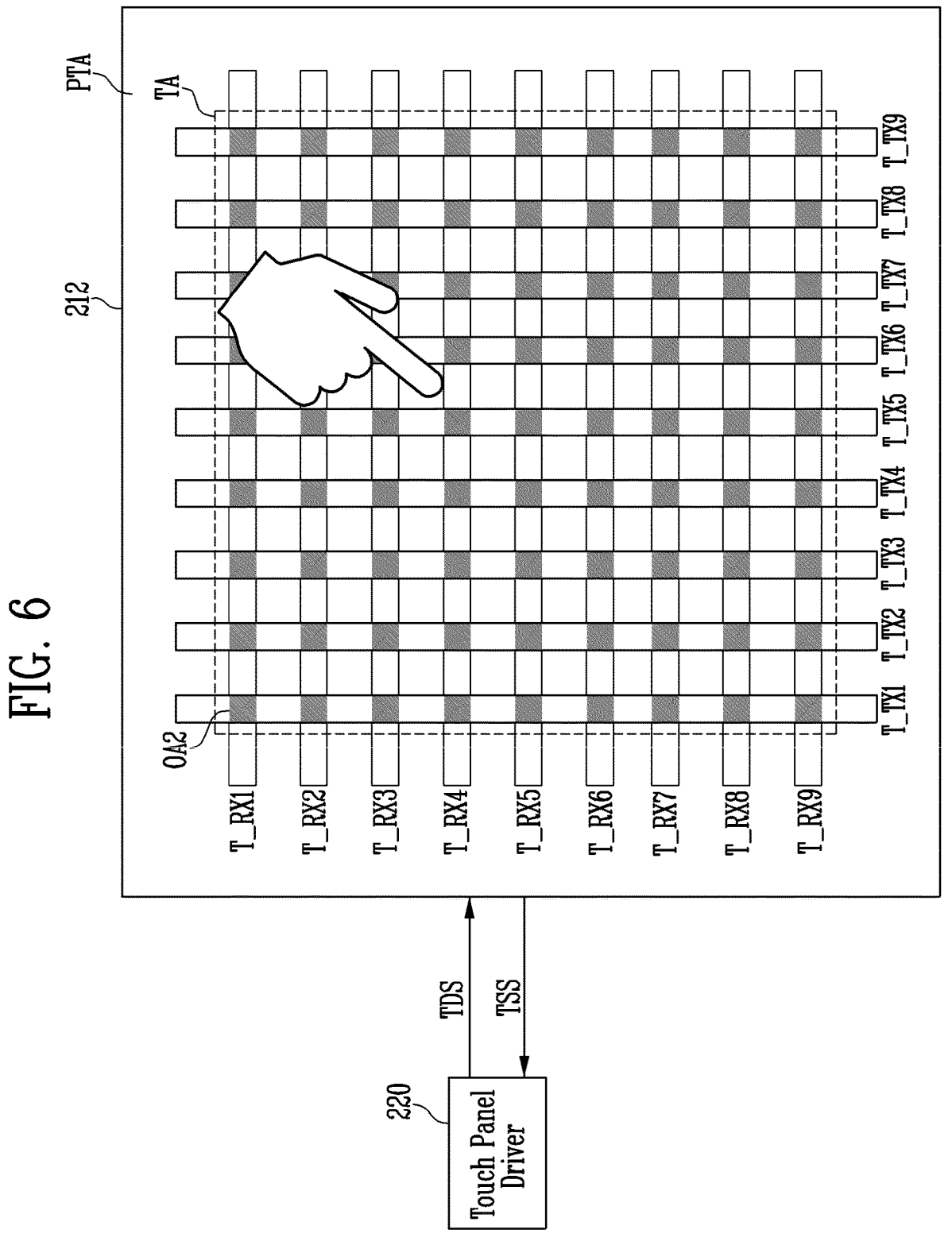
FIG. 6 is a diagram illustrating an example of an operation of the touch sensor of FIG. 1 in a first touch period.
Figure 7:
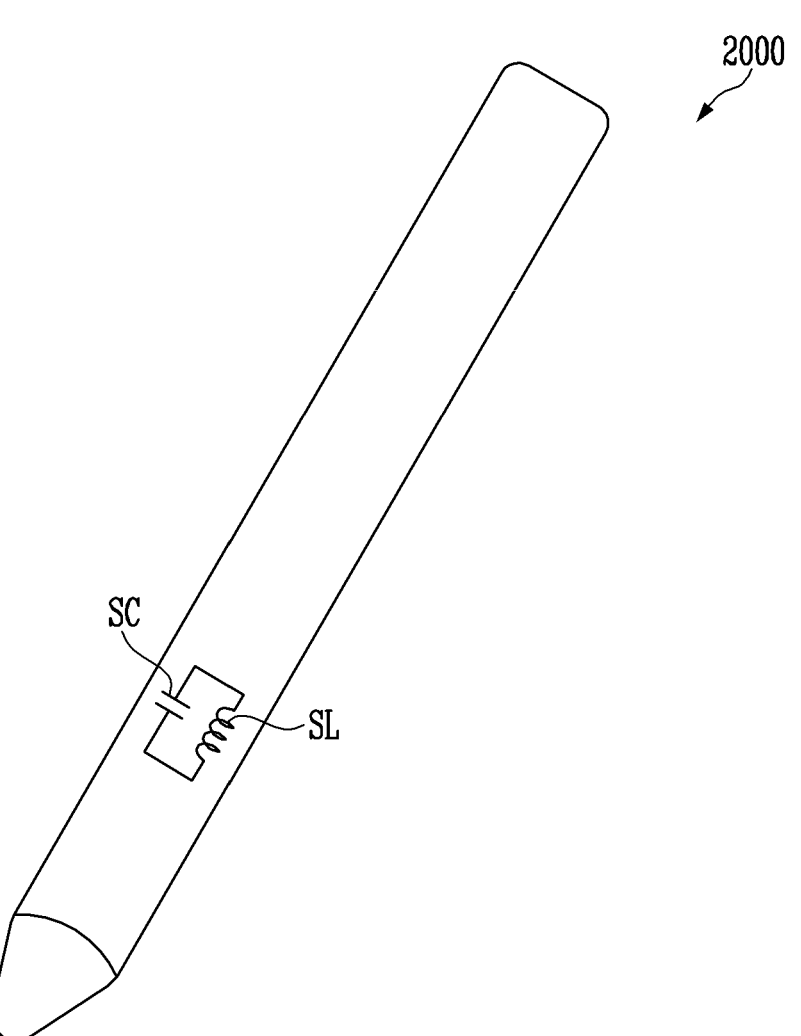
FIG. 7 is a diagram illustrating an example of a stylus pen.
Figure 8:
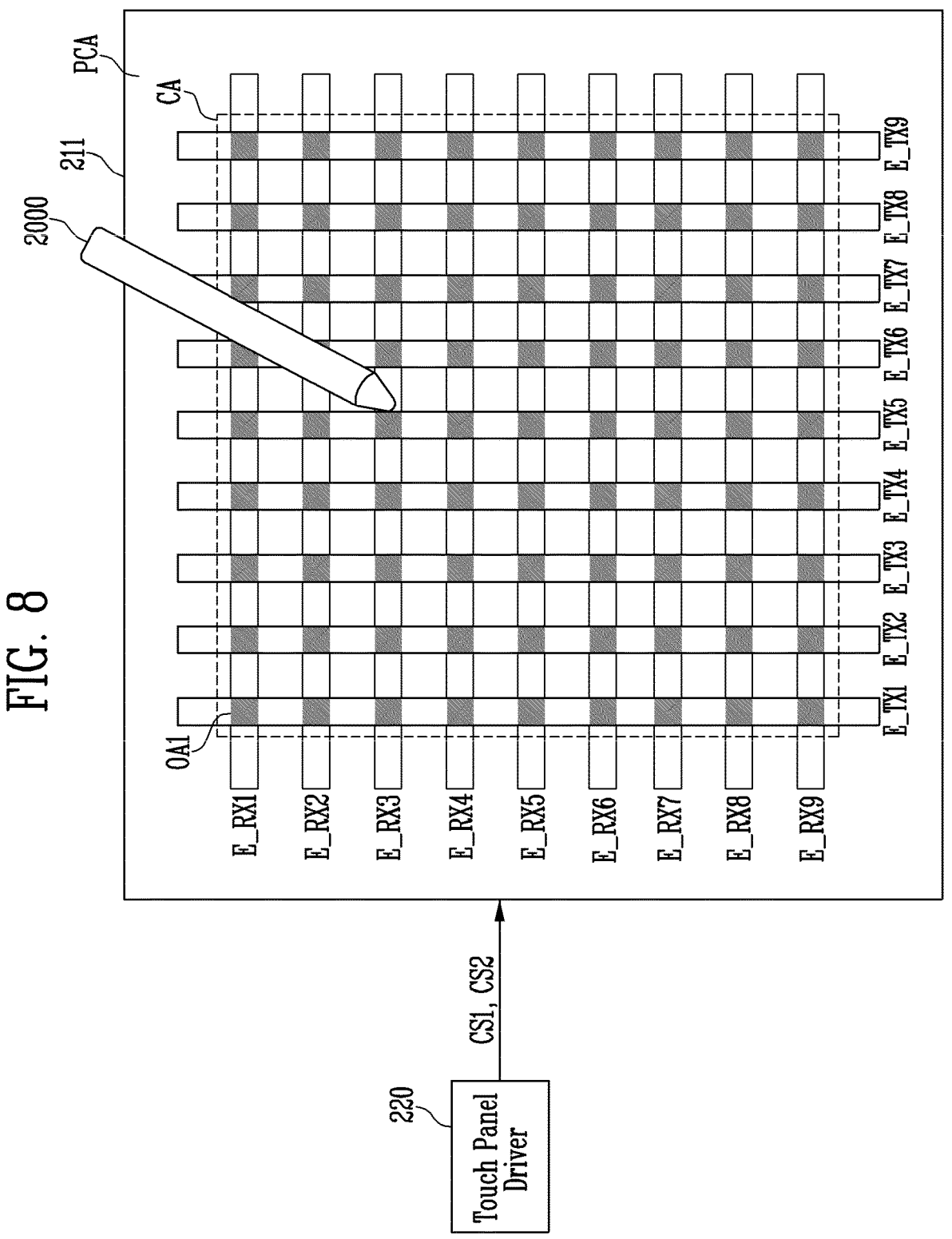
FIG. 8 is a diagram illustrating an example of an operation of the charger of FIG. 1 in a first charge period and a second charge period of a second touch period.
Figure 9:
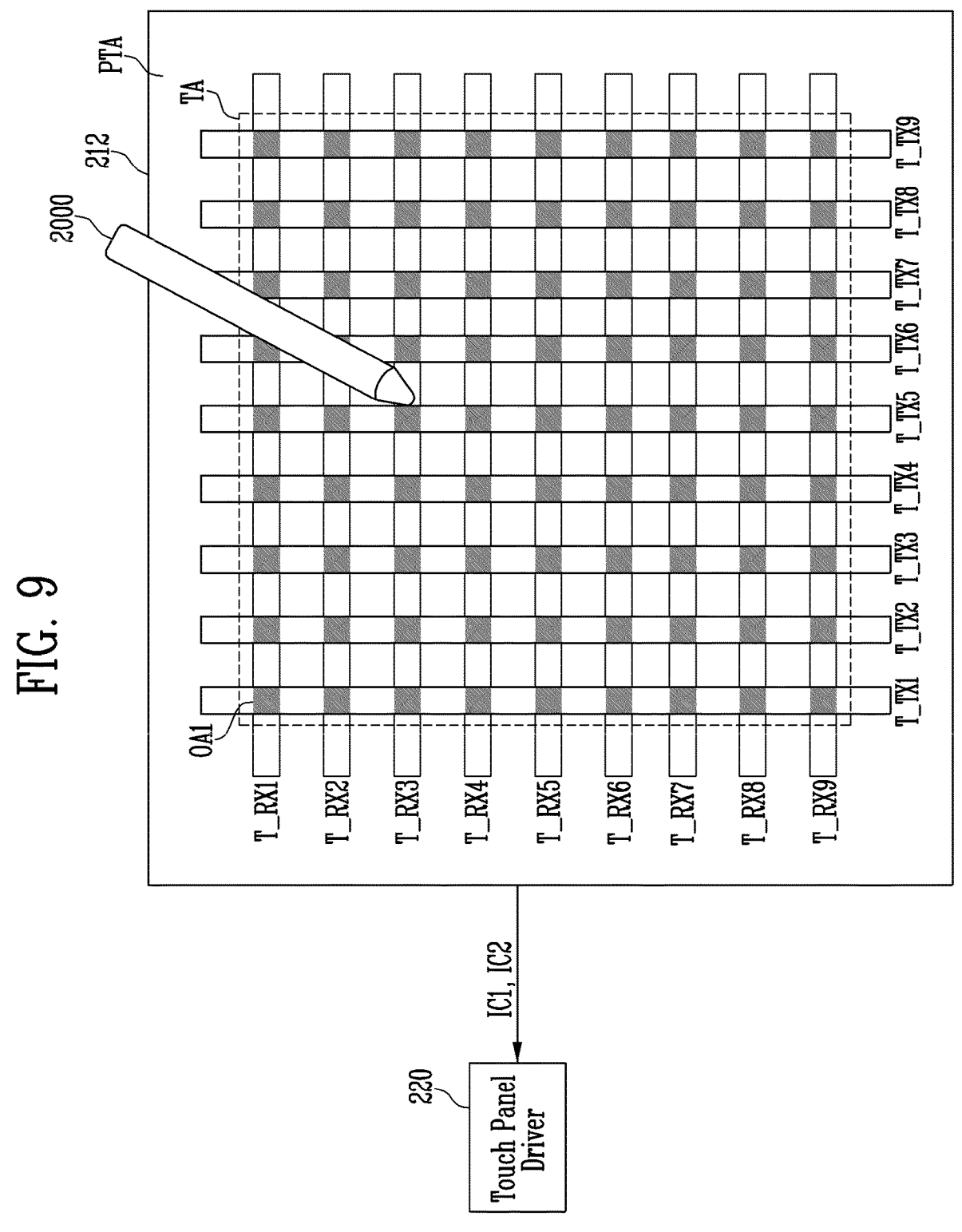
FIG. 9 is a diagram illustrating an example of the operation of the touch sensor of FIG. 1 in a second touch period.

FIG. 6 is a diagram illustrating an example of an operation of the touch sensor 212 of FIG. 1 in a first touch period, FIG. 7 is a diagram illustrating an example of a stylus pen 2000, FIG. 8 is a diagram illustrating an example of an operation of the charger 211 of FIG. 1 in a first charge period and a second charge period of a second touch period, and FIG. 9 is a diagram illustrating an example of the operation of the touch sensor 212 of FIG. 1 in a second touch period.

Referring to FIGS. 1 and 6 to 9, the touch panel driver 220 may provide a touch driving signal TDS to the touch sensor 212 in the first touch period and provide a first charge voltage CS1 and a second charge voltage CS2 to the charger 211 in the second touch period.

The display device 1000 may sense a touch through a capacitive method in the first touch period. The display device 1000 may sense a touch through an electromagnetic resonance method in the second touch period.

The display device 1000 may include one first touch period and one second touch period during one touch cycle. A scan rate of the touch panel 210 may correspond to the number of times the display device 1000 senses a touch per time. For example, as the scan rate of the touch panel 210 increases, the number of times the display device 1000 senses the touch per second may increase.

Referring to FIG. 6, the touch panel driver 220 may provide the touch driving signal TDS to the first touch electrodes T_TX1, T_TX2, ..., and T_TX9 in the first touch period, and receive a touch sensing signal TSS corresponding to the touch driving signal TDS from the second touch electrodes T_RX1, T_RX2, ..., and T_RX9. The touch panel driver 220 may receive the touch sensing signal TSS to detect whether a touch is input and/or a touch coordinate.

For example, when an object (for example, a human finger) approaches the touch sensor 212, a capacitance between the first touch electrodes T_TX1, T_TX2, ..., and T_TX9 and the second touch electrodes T_RX1, T_RX2, ..., T_RX9 may change. In addition, as the capacitance changes, the touch sensing signal TSS may also change. Accordingly, the touch panel driver 220 may detect whether the touch is input and/or the touch coordinate based on the changed touch sensing signal TSS.

Referring to FIGS. 7 to 9, the second touch period may include the first charge period, the second charge period, and a discharging period. The display device 1000 may charge the stylus pen 2000 in the first charge period, and detect whether or not a touch of the stylus pen 2000 is input and/or a touch coordinate in the discharge period of the second touch period.

The stylus pen 2000 may include an LC resonance circuit including a stylus capacitor SC and a stylus inductor SL. For example, the stylus capacitor SC may include a first electrode connected to a first electrode of the stylus inductor SL and a second electrode connected to a second electrode of the stylus inductor SL.

For example, as shown in FIG. 8, the charge electrodes E_TX1, E_TX2, ..., and E_TX9 may receive the first charge voltage CS1 and the second charge voltage CS2 to form a magnetic field in the first charge period and the second charge period. When the stylus pen 2000 approaches the charge electrodes E_TX1, E_TX2, ..., and E_TX9 in which the magnetic field is formed, an induced current may be generated in the LC resonance circuit of the stylus pen 2000. A charge may be charged in the stylus capacitor SC by the induced current. That is, the stylus pen 2000 may be charged.

For example, as shown in FIG. 9, the touch panel driver 220 may not provide the touch driving signal TDS of FIG. 6 to the touch sensor 212 in the second touch period. The touch panel driver 220 may not provide the first charge voltage CS1 and the second charge voltage CS2 to the charge electrodes E_TX1, E_TX2, ..., and E_TX9 in the first charge period and the second charge period. Therefore, when the charged stylus pen 2000 approaches the touch electrodes T_TX1, T_TX2, ..., T_TX9, T_RX1, T_RX2, ..., and T_RX9, a first induced current IC1 may be generated in the first touch electrodes T_TX1, T_TX2, ..., and T_TX9, and a second induced current IC2 may be generated in the second touch electrodes T_RX1, T_RX2, ..., and T_RX9. The touch panel driver 222 may detect whether or not the touch of the stylus pen 2000 is input and/or the touch coordinate based on the first induced current IC1 and the second induced current IC2.

The display device 1000 may operate in a pen detection mode or a pen active mode in the second touch period. The display device 1000 may operate in the pen detection mode when the stylus pen 2000 is not detected. The display device 1000 may detect whether the touch of the stylus pen 2000 is input in the pen detection mode. To this end, the display device 1000 may form a magnetic field in the entire charge area CA through time-division driving during one touch cycle. In addition, when the touch of the stylus pen 2000 is detected in the pen detection mode, the display device 1000 may operate in the pen active mode. The display device 1000 may form a magnetic field around a position where the stylus pen 2000 is detected in the pen active mode. In addition, the display device 1000 may prioritize a touch detected by an electromagnetic resonance method over a touch detected by an electrostatic capacitive method. Accordingly, the display device 1000 may prioritize a touch by the stylus pen 2000 over a touch by the finger or ignore the touch by the finger.

The second touch period in the pen detection mode may include the first charge period and the second charge period. The first charge period and the second charge period may be repeated alternately. The discharge period may be disposed between the first charge period and the second charge period.

For example, the display device 1000 may form the magnetic field in a first portion of the charge area CA in the first charge period and charge the stylus pen 2000 touched in the first portion. In addition, the display device 1000 may detect whether or not the touch of the stylus pen 2000 is input and/or the touch coordinate in the discharge period. Next, the display device 1000 may form the magnetic field in a second portion of the charge area CA in the first charge period and charge the stylus pen 2000 touched in the second portion. In addition, the display device 1000 may detect whether or not the touch of the stylus pen 2000 is input and/or the touch coordinate in the discharge period.

Therefore, the display device 1000 may form the magnetic field in the entire charge area CA through time division driving (that is, the first charge period and the second charge period). Accordingly, when the touch of the stylus pen 2000 exists anywhere in the touch area TA during one touch cycle, the touch of the stylus pen 2000 may be detected.

Figure 10:
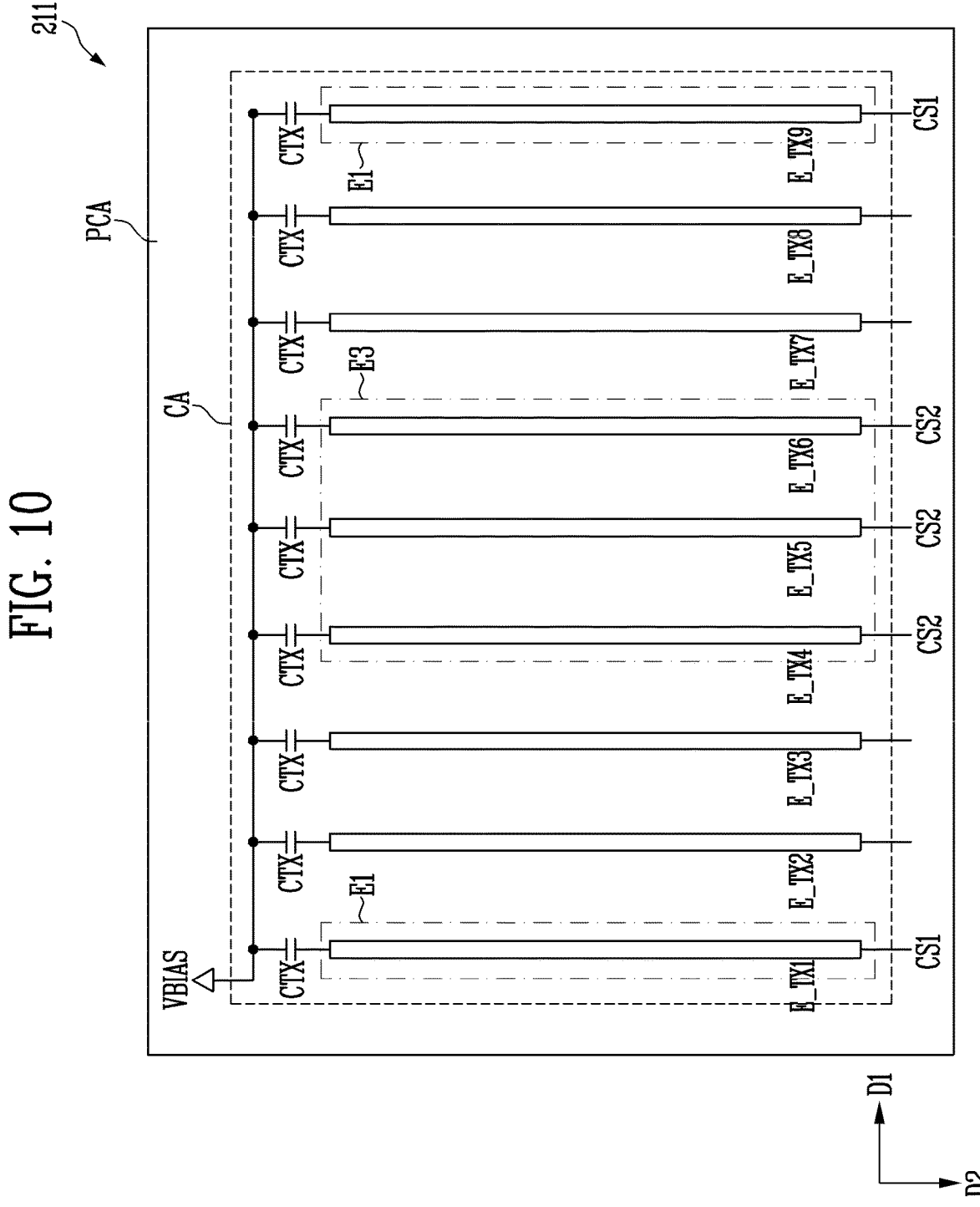
FIG. 10 is a diagram illustrating an example of an operation of the charger of FIG. 1 in the first charge period.
Figure 11:
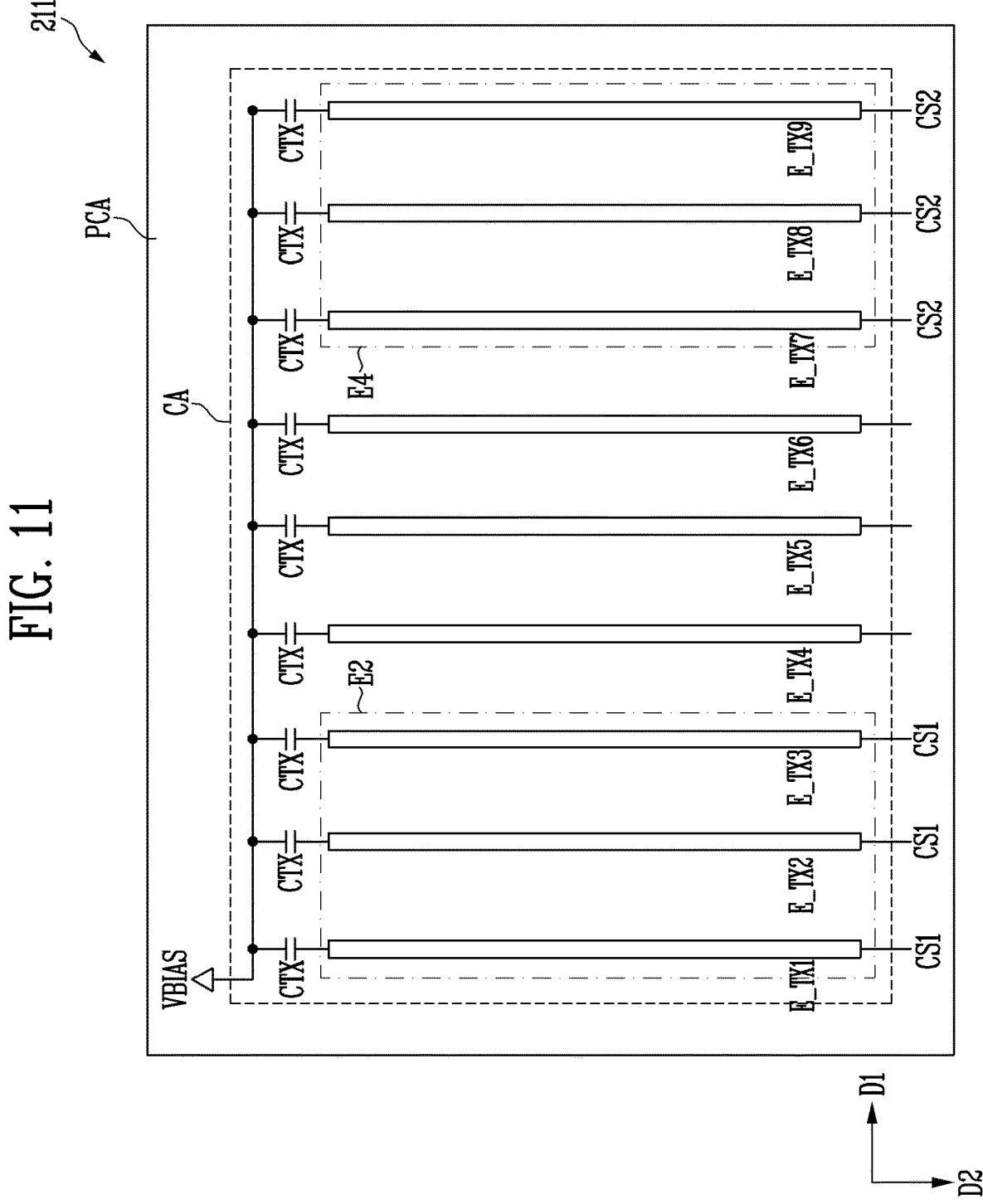
FIG. 11 is a diagram illustrating an example of an operation of the charger of FIG. 1 in the second charge period.
Figure 12:
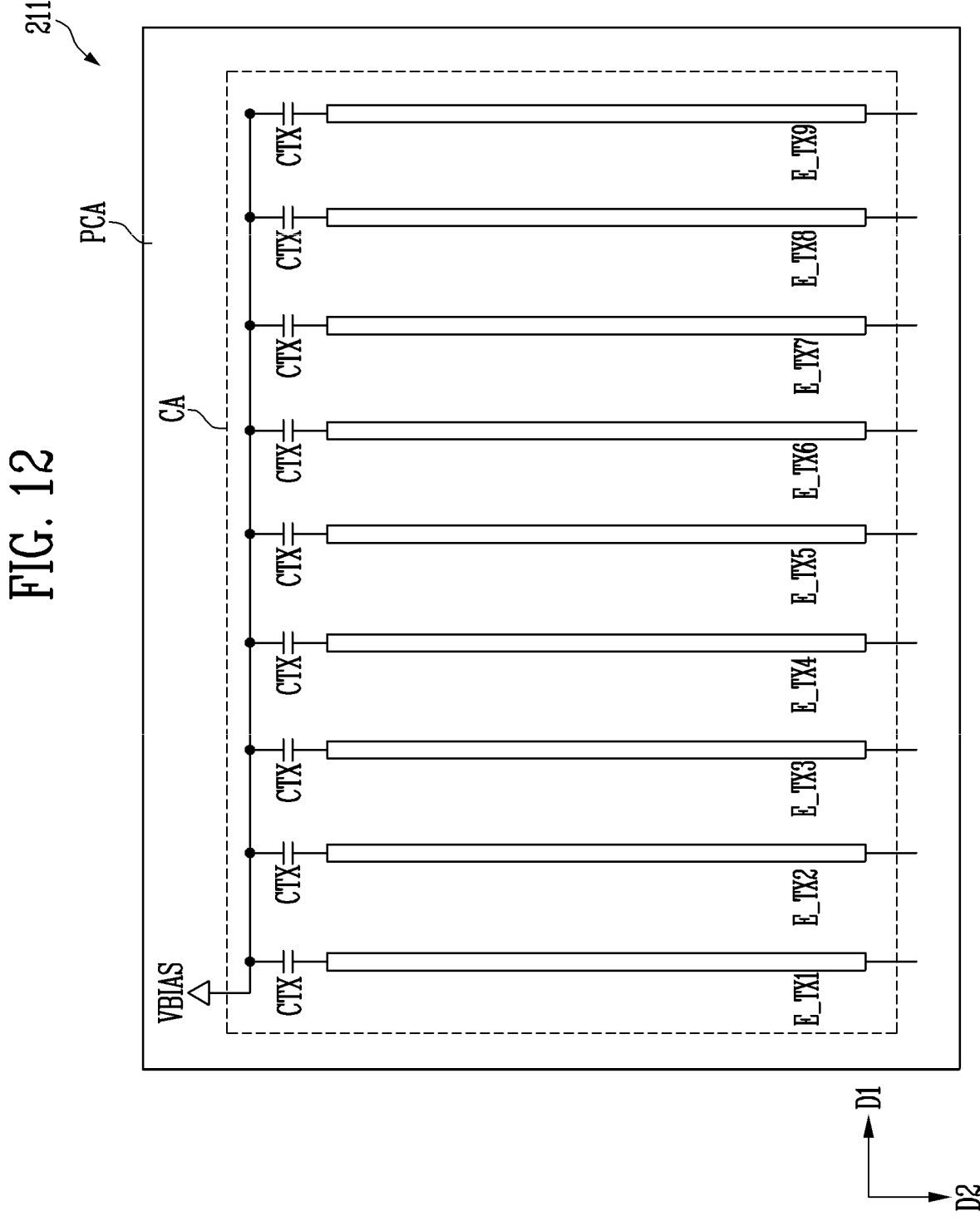
FIG. 12 is a diagram illustrating an example of an operation of the charger of FIG. 1 in a discharge period.

FIG. 10 is a diagram illustrating an example of an operation of the charger 211 of FIG. 1 in the first charge period, FIG. 11 is a diagram illustrating an example of an operation of the charger 211 of FIG. 1 in the second charge period, and FIG. 12 is a diagram illustrating an example of an operation of the charger 211 of FIG. 1 in the discharge period.

In FIGS. 10 to 12, the auxiliary electrodes E_RX1, E_RX2, . . . , and E_RX9 are omitted for convenience of description.

Referring to FIGS. 1, 3, 7, and 10 to 12, the charge electrodes E_TX1, E_TX2, . . . , and E_TX9 may be connected to the charge capacitor CTX. For example, the charge capacitor CTX may include a first electrode connected to the charge electrodes E_TX1, E_TX2, . . . , and E_TX9 and a second electrode receiving a bias voltage VBIAS. Since each of the charge capacitor CTX is connected to one end of each of the charge electrodes E_TX1, E_TX2, . . . , and E_TX9, a current influence between the charge electrodes E_TX1, E_TX2, . . . , and E_TX9 may be reduced. For example, in fluence of current flowing through the charge electrode E_TX1 on the charge electrodes E_TX2, . . . , and E_TX9 may be reduced by the charge capacitor CTX.

In an embodiment, each of the auxiliary electrodes E_RX1, E_RX2, . . . , and E_RX9 and each of the touch electrodes T_TX1, T_TX2, . . . , T_TX9, T_RX1, T_RX2, may be connected to a capacitor receiving the bias voltage VBIAS like the charge electrodes E_TX1, E_TX2, E, . . . , and E_TX9.

The touch panel driver 220 may provide a first charge voltage CS1 having a first phase to N first charge electrodes E1 among the charge electrodes E_TX1, E_TX2, . . . , and E_TX9 in the first charge period, and may provide the first charge voltage CS1 to M (M is different from N) second charge electrodes E2 among the charge electrodes E_TX1, E_TX2, . . . , and E_TX9 in the second charge period. Here, N is a positive integer greater than or equal to 2, and M is a positive integer. That is, the number of charge electrodes E_TX1, E_TX2, . . . , and E_TX9 receiving the first charge voltage CS1 in the first charge period and the second charge period may be freely determined. For example, as shown in FIGS. 10 and 11, the number of first charge electrodes E1 may be two and the number of second charge electrodes E2 may be three.

The touch panel driver 220 may provide a second charge voltage CS2 having a second phase different from the first phase to a third charge electrode E3 among the charge electrodes E_TX1, E_TX2, . . . , and E_TX9 in the first charge period, and may provide the second charge voltage CS2 to a fourth charge electrode E4 among the charge electrodes E_TX1, E_TX2, . . . , and E_TX9 in the second charge period. That is, the number of charge electrodes E_TX1, E_TX2, . . . , and E_TX9 receiving the second charge voltage CS2 in the first charge period and the second charge period may be freely determined.

A minimum distance between the second charge electrodes E2 and the fourth charge electrode E4 in the second charge period may be different from a minimum distance between the first charge electrodes E1 and the third charge electrode E3 in the first charge period. That is, a distance between the charge electrodes E_TX1, E_TX2, . . . , and E_TX9 receiving the first charge voltage CS1 and the charge electrodes E_TX1, E_TX2, . . . , and E_TX9 receiving the second charge voltage CS2 in the first charge period and the second charge period may be freely determined. For example, the minimum distance between the second charge electrodes E2 and the fourth charge electrode E4 may be three charge electrodes (that is, E_TX4, E_TX5, and E_TX6), and the minimum distance between the first charge electrodes E1 and the third charge electrode E3 may be two charge electrodes (that is, E_TX2 and E_TX3).

As described above, the display device 1000 may time-divisionally drive the charger 211 in various methods by freely determining the number of charge electrodes E_TX1, E_TX2, . . . , and E_TX9 receiving the first charge voltage CS1 in the first charge period and the second charge period, the number of charge electrodes E_TX1, E_TX2, . . . , and E_TX9 receiving the second charge voltage CS2 in the first charge period and the second charge period, and the distance between the charge electrodes E_TX1, E_TX2, . . . , and E_TX9 receiving the first charge voltage CS1 and the charge electrodes E_TX1, E_TX2, . . . , and E_TX9 receiving the second charge voltage CS2 in the first charge period and the second charge period. Accordingly, the display device 1000 may drive the charger 211 with a small number of divisions, such as 2 divisions. In addition, as the number of divisions decreases, a scan rate of the touch panel 210 may increase.

The first charge voltage CS1 and the second charge voltage CS2 may be AC voltages. The first phase may be opposite to the second phase. That is, directions of the magnetic field generated by the charge electrodes receiving the first charge voltage CS1 (that is, the first charge electrode E1 and the third charge electrode E3) and the magnetic field generated by the charge electrodes receiving the second charge voltage CS2 (that is, the second charge electrode E2 and the fourth charge electrode E4) may be opposite. Accordingly, a strong magnetic field may be generated between the first charge electrode E1 and the third charge electrode E3 and between the second charge electrode E2 and the fourth charge electrode E4.

In an embodiment, a first portion (for example, E_TX1) of the first charge electrodes E1 may be disposed adjacent to the third charge electrode E3 in the first direction D1, and a second portion (for example, E_TX9) of the first charge electrodes E1 may be disposed adjacent to the third charge electrode E3 in the direction opposite to the first direction D1. In an embodiment, the third charge electrode E3 may include a charge electrode (for example, E_TX4, E_T5, and E_TX6) disposed between the second charge electrode E2 and the fourth charge electrode E4 among the charge electrodes E_TX1, E_TX2, . . . , and E_TX9. As described above, since the first charge electrodes E1 are disposed on both sides of the third charge electrode E3, a magnetic field may be generated on both sides of the third charge electrode E3 in the first charge period. In addition, since the third charge electrode E3 is disposed between the second charge electrode E2 and the fourth charge electrode E4, a magnetic field may be generated at a position of the third charge electrode E3 in the second charge period. Therefore, during one second touch period, the touch panel driver 220 may generate a magnetic field throughout the charge area CA.

In an embodiment, at least one of the first charge electrodes E1 may be a charge electrode (for example, E_TX1) of an end of the first direction D1 among the charge electrodes E_TX1, E_TX2, . . . , and E_TX9, and at least one of the first charge electrodes E1 may be a charge electrode (for example, E_TX9) of an end of the direction opposite to the first direction D1 among the charge electrodes E_TX1, E_TX2, . . . , and E_TX9. Accordingly, the touch panel driver 220 may generate a magnetic field throughout the charge area CA.

For example, as shown in FIG. 10, the first charge voltage CS1 may be applied to the charge electrodes of E_TX1 and E_TX9, and the second charge voltage CS2 may be applied to the charge electrodes of E_TX4, E_TX5, and E_TX6. In this case, a strong magnetic field may be generated between the charge electrode of E_TX1 and the charge electrodes of E_TX4, E_TX5, and E_TX6, and a strong magnetic field may be generated between the charge electrode of E_TX9 and the charge electrodes of E_TX4, E_TX5, and E_TX6.

For example, as shown in FIG. 11, the first charge voltage CS1 may be applied to the charge electrodes of E_TX1, E_TX2, and E_TX3, and the second charge voltage CS2 may be applied to the charge electrodes of E_TX7, E_TX8, and E_TX9. In this case, a strong magnetic field may be generated between the charge electrodes of E_TX1, E_TX2, and E_TX3 and the charge electrodes of E_TX7, E_TX8, and E_TX9.

The touch panel driver 220 may not provide the first charge voltage CS1 and the second charge voltage CS2 to the charge electrodes E_TX1, E_TX2, . . . , and E_TX9 in the discharge period. As described above, in the discharge period, the stylus pen 2000 may generate an induced current in the touch electrodes of the touch panel 210.

In the present embodiment, one method of driving the charger 211 in two divisions is exemplified, but the method of driving the charger 211 in two divisions is not limited thereto.

Figure 13:
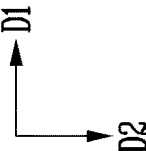
FIG. 13 is a diagram illustrating the charger of a display device according to embodiments of the disclosure.
Figure 14:
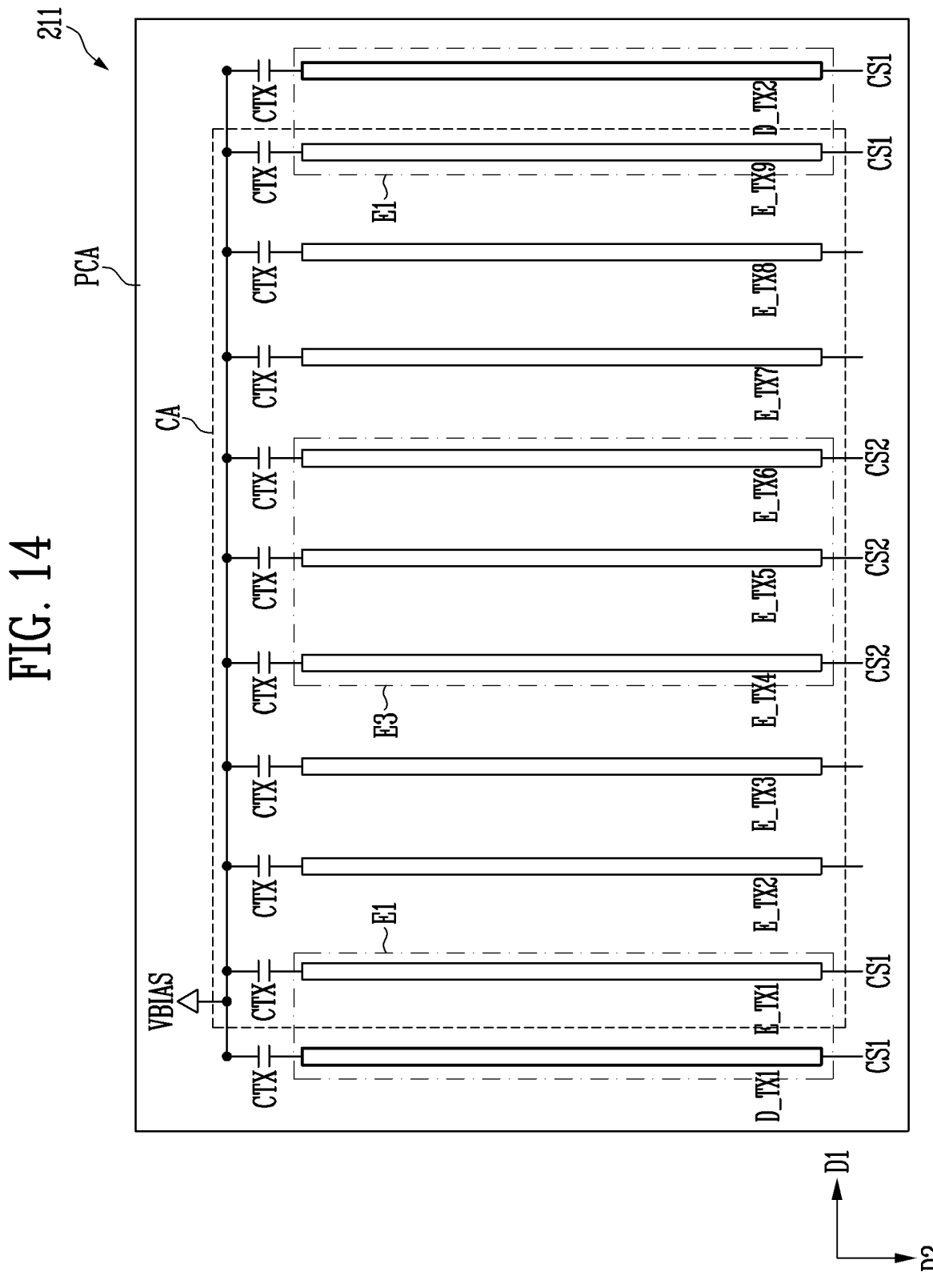
FIG. 14 is a diagram illustrating an example of an operation of the charger of FIG. 13 in the first charge period.
Figure 15:
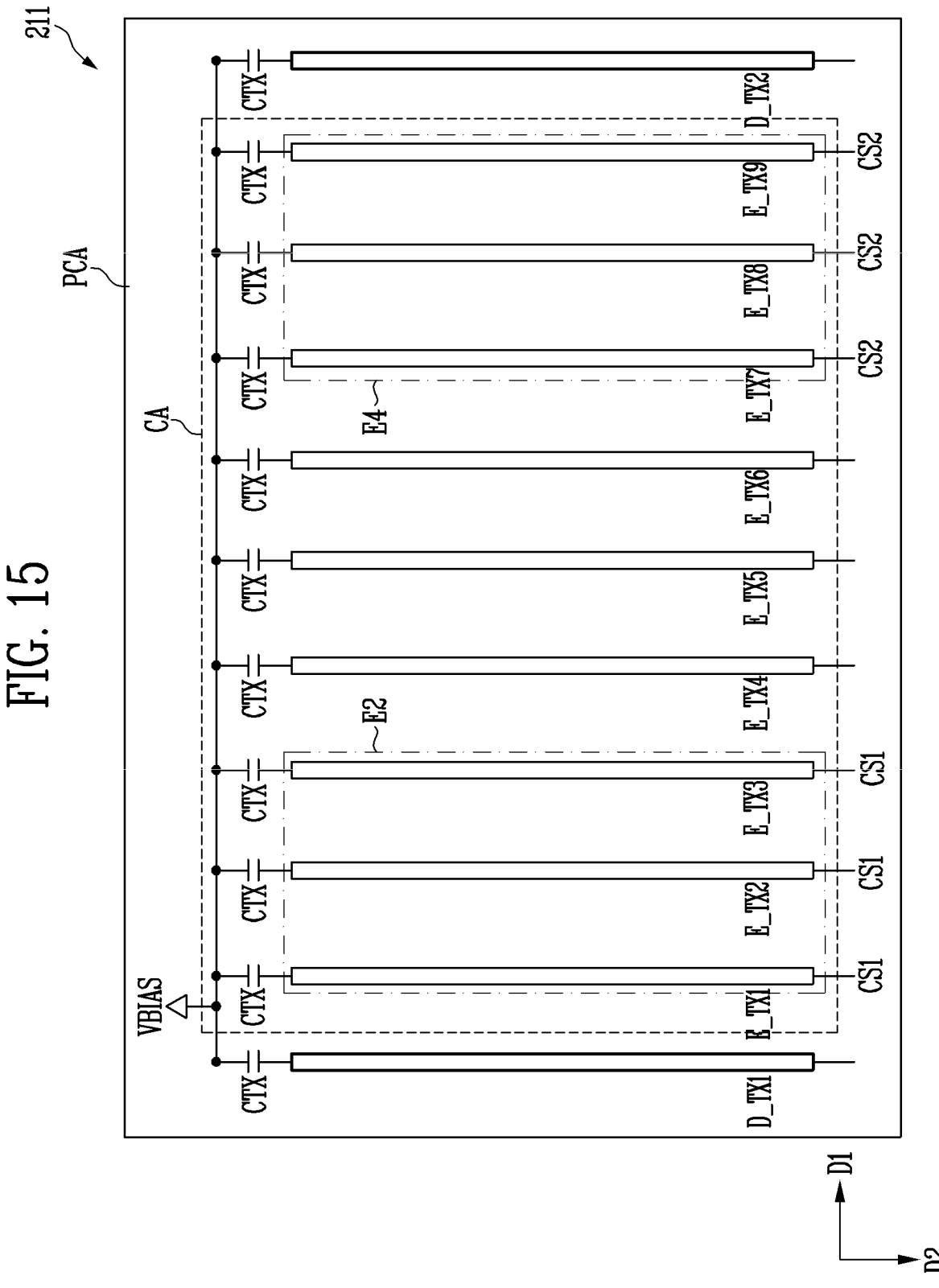
FIG. 15 is a diagram illustrating an example of an operation of the charger of FIG. 13 in the second charge period.

FIG. 13 is a diagram illustrating the charger 211 of a display device according to embodiments of the disclosure, FIG. 14 is a diagram illustrating an example of an operation of the charger 211 of FIG. 13 in the first charge period, and FIG. 15 is a diagram illustrating an example of an operation of the charger 211 of FIG. 13 in the second charge period.

Since a configuration of the display device according to the present embodiments is substantially the same as the configuration of the display device of FIG. 1 except for a dummy charge electrode D_TX, the same reference numerals and reference symbols are used for identical or similar components, and an overlapping description is omitted.

In FIGS. 14 and 15, the auxiliary electrodes E_RX1, E_RX2, . . . , and E_RX9 are omitted for convenience of description.

Referring to FIGS. 1, 7, and 13 to 15, the charger 211 may include dummy charge electrodes D_TX1 and D_TX2 included in the second peripheral area PCA. The dummy charge electrodes D_TX1 and D_TX2 may be formed in substantially the same shape as the charge electrodes E_TX1, E_TX2, . . . , and E_TX9.

The touch panel driver 220 may provide the first charge voltage CS1 to the dummy charge electrodes D_TX1 and D_TX2 in at least one of the first charge period and the second charge period. The touch panel driver 220 may provide the second charge voltage CS2 to the dummy charge electrodes D_TX1 and D_TX2 in at least one of the first charge period and the second charge period.

The dummy charge electrodes D_TX1 and D_TX2 may also form a magnetic field, by providing the charge voltages CS1 and CS2 to the dummy charge electrodes D_TX1 and D_TX2. In addition, a magnetic field may be sufficiently formed at both ends (that is, an edge portion) of the charge area CA by the magnetic field formed by the dummy charge electrodes D_TX1 and D_TX2.

For example, as shown in FIG. 14, in the first charge period, the first charge voltage CS1 may be applied to the dummy charge electrodes of D_TX1 and D_TX2, and the second charge voltage CS2 may be applied to the charge electrodes of E_TX4, E_TX5, and E_TX6. In this case, a strong magnetic field may be generated between the dummy charge electrode of D_TX1 and the charge electrodes of E_TX4, E_TX5, and E_TX6, and a strong magnetic field may be generated between the dummy charge electrode of D_TX2 and the charge electrodes of E_TX4, E_TX5, and E_TX6.

For example, as shown in FIG. 15, in the second charge period, the first charge voltage CS1 may be applied to the charge electrodes of E_TX1, E_TX2, and E_TX3, and the second charge voltage CS2 may be applied to the charge electrodes of E_TX7, E_TX8, and E_TX9. In this case, a strong magnetic field may be generated between the charge electrodes of E_TX1, E_TX2, and E_TX3 and the charge electrodes of E_TX7, E_TX8, and E_TX9.

In the present embodiment, one method of driving the charger 211 in two divisions is exemplified, but the method of driving the charger 211 in two divisions is not limited thereto.

Figure 16:
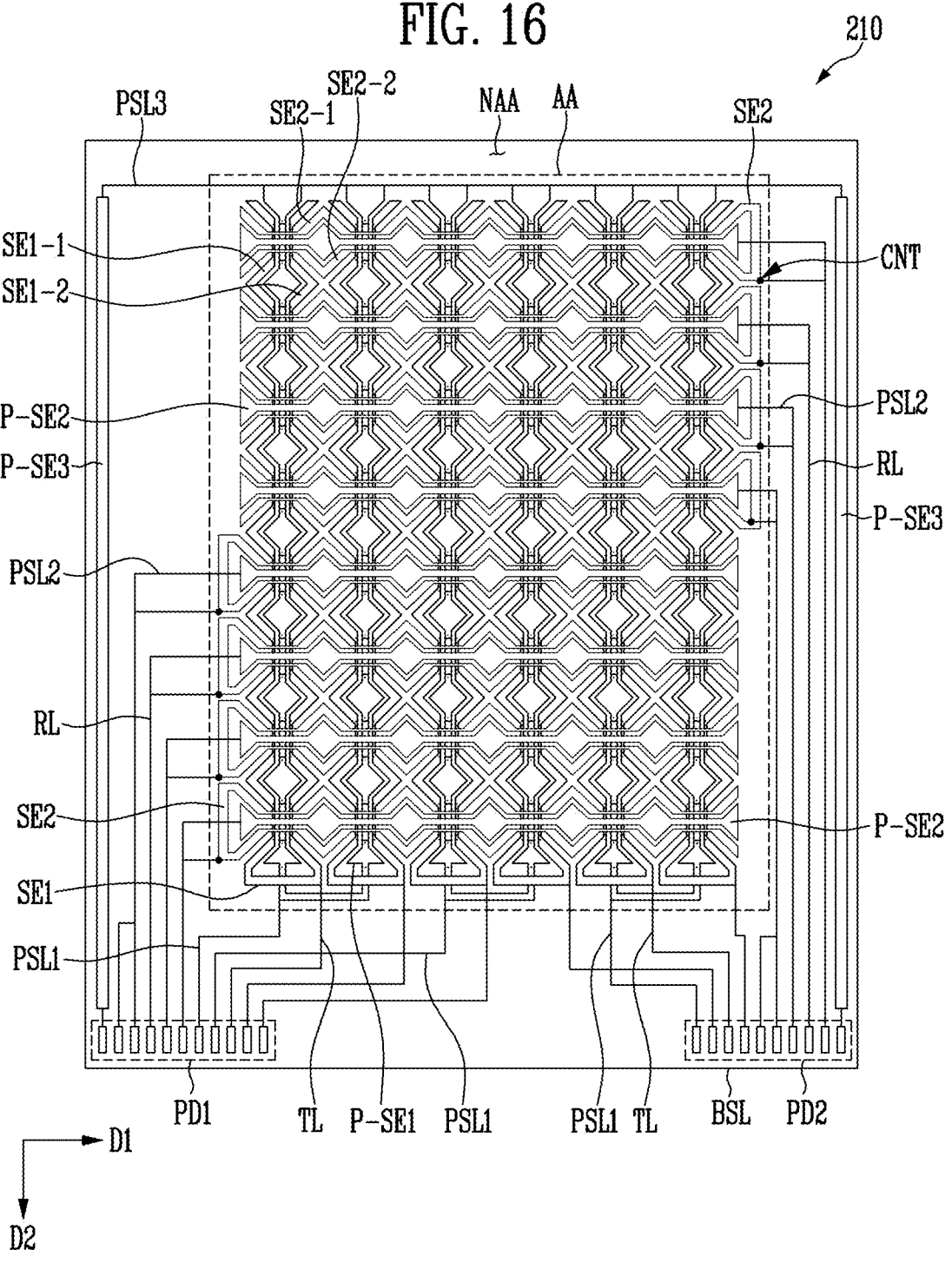
FIG. 16 is a plan view illustrating an example in which the charger and the touch sensor of the display device of FIG. 13 are integrally formed.

FIG. 16 is a plan view illustrating an example in which the charger 211 and the touch sensor 212 of the display device of FIG. 13 are integrally formed.

Referring to FIG. 16, the touch panel 210 may include the base layer BSL, the plurality of touch electrodes SE1 and SE2, the plurality of touch lines TL and RL, the plurality of charge electrodes P-SE1, the plurality of auxiliary electrodes P-SE2, the plurality of charge lines PSL1, PSL2, and PSL3, a dummy charge electrode P-SE3, the plurality of first pads PD1, and the plurality of second pads PD2.

The dummy charge electrode P-SE3 may be disposed in the peripheral area NAA. The dummy charge electrode P-SE3 may extend in the second direction D2.

A plurality of dummy charge electrodes P-SE3 may be provided. The plurality of dummy charge electrodes P-SE3 may be spaced apart from each other in the first direction D1 with the active area AA interposed therebetween. The plurality of dummy charge electrodes P-SE3 may be connected to a third pen sensing line PSL3. That is, the plurality of dummy charge electrodes P-SE3 may be electrically connected to the charge electrode P-SE1.

One of the plurality of dummy charge electrodes P-SE3 may be disposed on the left side of the active area AA of the touch panel 210 and connected to a corresponding first pad PD1. The other of the plurality of dummy charge electrodes P-SE3 may be disposed on the right side of the active area AA of the touch panel 210 and connected to a corresponding second pad PD2.

Figure 17:
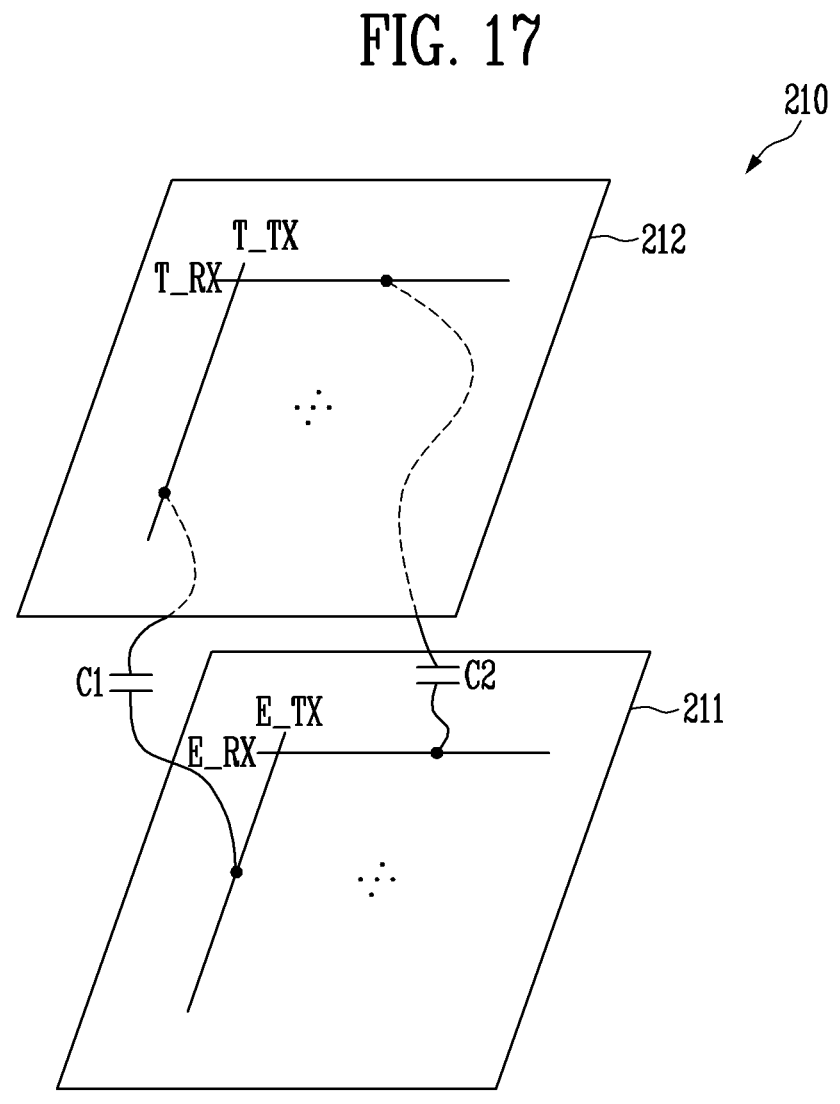

FIG. 17 is a diagram illustrating an example of capacitors C1 and C2 disposed between the charger 211 and the touch sensor 212 of FIG. 1.

Referring to FIG. 17, the touch panel 210 may include a first capacitor C1 including a first electrode connected to the first touch electrode T_TX and a second electrode connected to at least one of the charge electrodes E_TX. The touch panel 210 may include a second capacitor C2 including a first electrode connected to the second touch electrode T_RX and a second electrode connected to at least one of the auxiliary electrodes E_RX.

As the first capacitor C1 is connected to the first touch electrode T_TX, a capacitance of the first touch electrode T_TX may be increased. In addition, since the second capacitor C2 is connected to the second touch electrode T_RX, a capacitance of the second touch electrode T_RX may be increased.

The current induced by the stylus pen to the touch electrodes T_TX and T_RX may vary according to a touched position. For example, a current induced when the stylus pen touches one end of the touch electrodes T_TX and T_RX and a current induced when the stylus pen touches a middle of the touch electrodes T_TX and T_RX may be different from each other. Such a current deviation may be decreased as the capacitance of the touch electrodes T_TX and T_RX increases. That is, since the touch panel 210 includes the first capacitor C1 and the second capacitor C2, the current deviation may be decreased.

Figure 18:
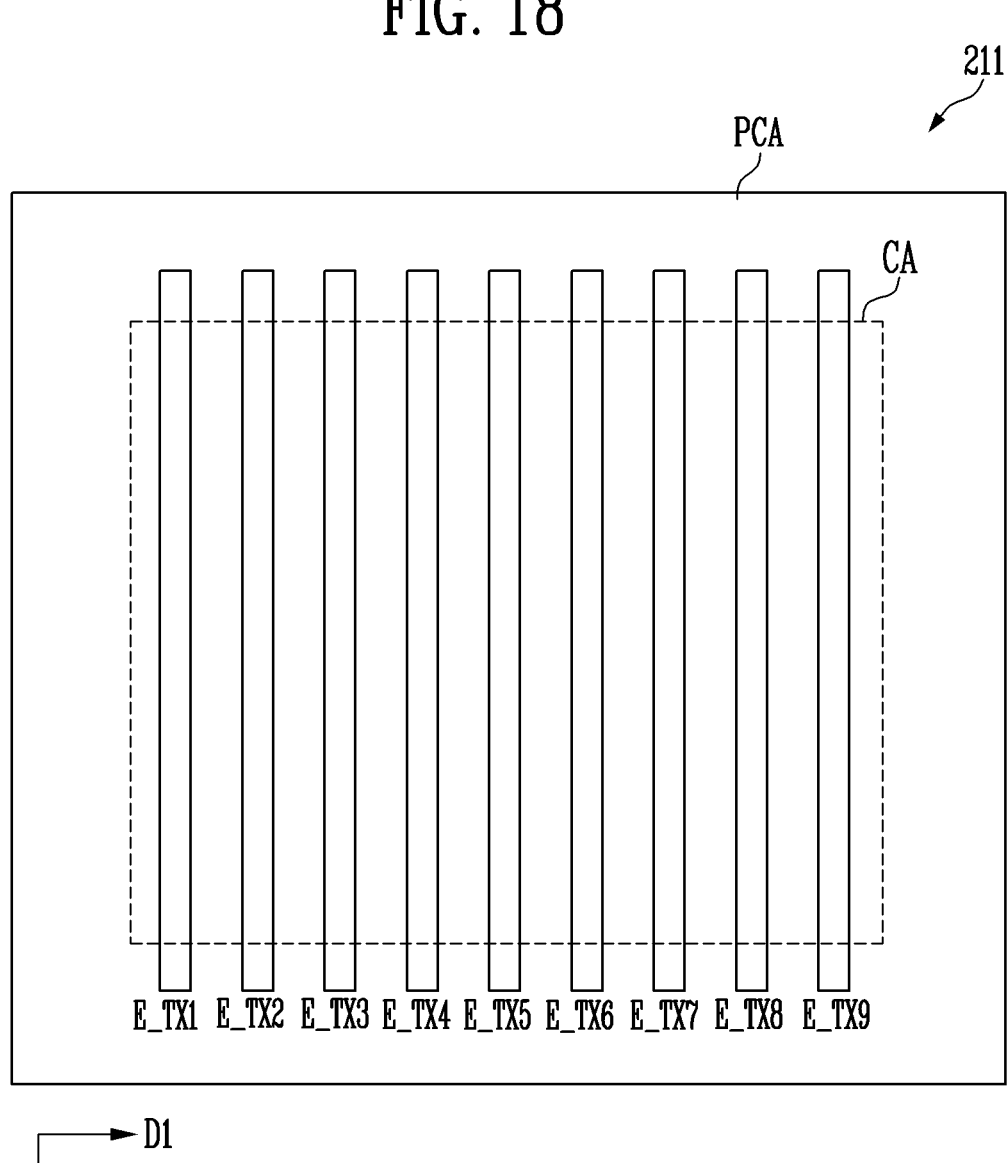
FIG. 18 is a diagram illustrating the charger according to embodiments of the disclosure.
Figure 18:
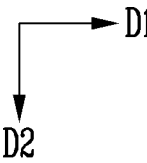

FIG. 18 is a diagram illustrating the charger 211 according to embodiments of the disclosure.

Since a configuration of a display device according to the present embodiments is substantially the same as the configuration of the display device of FIG. 1 except that the display device according to the present embodiments does not include auxiliary electrodes, the same reference numerals and reference symbols are used for identical or similar components, and an overlapping description is omitted.

Referring to FIG. 18, the charger 211 may include the charge electrodes E_TX1, E_TX2, . . . , and E_TX9. Differently from FIG. 3, the display device of FIG. 18 may not include auxiliary electrodes. As described with reference to FIGS. 10 to 12, since the charge of the stylus pen 2000 is performed through the charge electrodes E_TX1, E_TX2, . . . , and E_TX9, auxiliary electrodes may be omitted.

Figure 19:
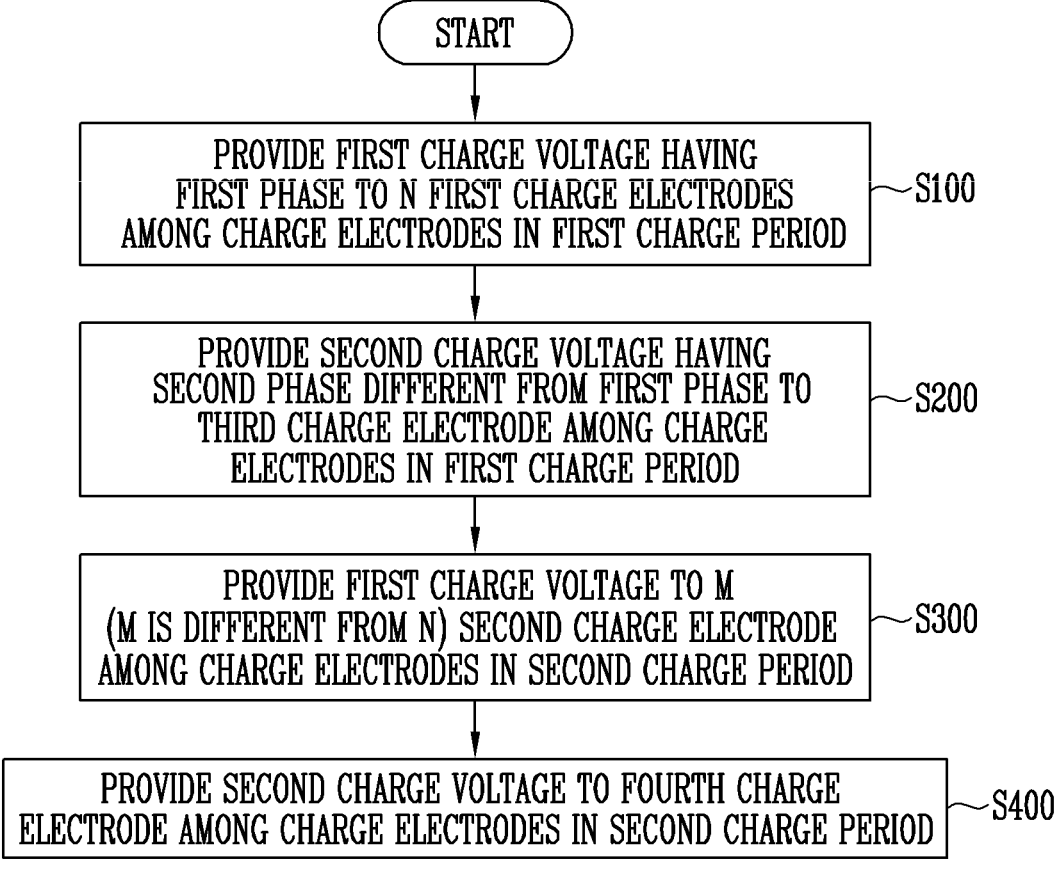
FIG. 19 is a flowchart illustrating a method of driving a display device according to embodiments.

FIG. 19 is a flowchart illustrating a method of driving a display device according to embodiments.

Referring to FIG. 19, the method of driving the display device of FIG. 19 may provide a first charge voltage having a first phase to N first charge electrodes among charge electrodes in a first charge period (S100), provide a second charge voltage having a second phase different from the first phase to a third charge electrode among the charge electrodes in the first charge period (S200), provide the first charge voltage to M (M is different from N) second charge electrodes among the charge electrodes in a second charge period (S300), and provide the second charge voltage to a fourth charge electrode among the charge electrodes in the second charge period (S400).

In an embodiment, a minimum distance between the second charge electrodes and the fourth charge electrode may be different from a minimum distance between the first charge electrodes and the third charge electrode. That is, the number of charge electrodes receiving the first charge voltage in the first charge period and the second charge period may be freely determined.

The method of driving the display device of FIG. 19 may provide a touch driving signal to a touch sensor in a first touch period. The display device may sense a touch through a capacitive method in the first touch period. The display device may detect a touch in a second touch period through an electromagnetic resonance method.

The display device may include one first touch period and one second touch period during one touch cycle. The second touch period may include a first charge period, a second charge period, and a discharge period. The display device may charge a stylus pen in the first charge period and the second charge period, and detect whether or not a touch of the stylus pen is input and/or a touch coordinate in the discharge period of the second touch period.

The disclosure may be applied to a display device and an electronic device including the display device. For example, the disclosure may be applied to a digital TV, a 3D TV, a mobile phone, a smart phone, a tablet computer, a VR device, a PC, a home electronic device, a notebook computer, a PDA, a PMP, a digital camera, a music player, a portable game console, a navigation system, and the like.

Although described with reference to the above embodiments, it will be understood that those skilled in the art can variously modify and change the disclosure without departing from the spirit and scope of the disclosure described in the claims below.

What is claimed is:
1. A display device comprising:
a display panel including sub-pixels;
a display panel driver configured to control the display panel;
a touch panel including a touch sensor including a plurality of touch electrodes and a charger including a plurality of charge electrodes; and
a touch panel driver configured to provide a first charge voltage having a first phase to N first charge electrodes among the charge electrodes in a first charge period and provide the first charge voltage to M (M is different from N) second charge electrode among the charge electrodes in a second charge period, where N is a positive integer greater than or equal to 2 and M is a positive integer.

2. The display device according to claim 1, wherein the touch panel driver provides a second charge voltage having a second phase different from the first phase to a third charge electrode among the charge electrodes in the first charge period and provides the second charge voltage to a fourth charge electrode among the charge electrodes in the second charge period.

3. The display device according to claim 2, wherein the first charge period and the second charge period are alternately repeated.

4. The display device according to claim 2, wherein a first portion of the first charge electrodes is disposed adjacent to the third charge electrode in a first direction, and a second portion of the first charge electrodes is disposed adjacent to the third charge electrodes in a direction opposite to the first direction.

5. The display device according to claim 4, wherein the third charge electrode is disposed between the second charge electrode and the fourth charge electrode.

6. The display device according to claim 2, wherein a minimum distance between the second charge electrodes and the fourth charge electrode is different from a minimum distance between the first charge electrodes and the third charge electrode.

7. The display device according to claim 2, wherein the touch panel driver provides a touch driving signal to the touch sensor in a first touch period and provides the first charge voltage and the second charge voltage to the charger in a second touch period.

8. The display device according to claim 7, wherein the touch panel driver does not provide the touch driving signal to the touch sensor in the second touch period.

9. The display device according to claim 7, wherein the second touch period includes the first charge period, the second charge period, and a discharge period, and wherein the discharge period is disposed between the first charge period and the second charge period.

10. The display device according to claim 9, wherein the touch panel driver does not provide the first charge voltage and the second charge voltage to the charge electrodes in the discharge period.

11. The display device according to claim 1, wherein the display panel comprises:

a display area including the sub-pixels; and a first peripheral area disposed adjacent to the display area, wherein the charger comprises:

a charge area including the charge electrodes; and a second peripheral area disposed adjacent to the charge area, and wherein the first peripheral area overlaps the second peripheral area in a plan view.

12. The display device according to claim 11, wherein the charger further comprises a dummy charge electrode disposed in the second peripheral area.

13. The display device according to claim 12, wherein the touch panel driver provides the first charge voltage to the dummy charge electrode in at least one of the first charge period and the second charge period.

14. The display device according to claim 1, wherein the touch electrodes comprises:

a first touch electrode extending in a first direction; and a second touch electrode extending in a second direction crossing the first direction, and the charge electrodes extend in the first direction.

15. The display device according to claim 14, wherein the touch panel further comprises a first capacitor including a first electrode connected to the first touch electrode and a second electrode connected to at least one of the charge electrodes.

16. The display device according to claim 14, wherein the charger further comprises auxiliary electrodes extending in the second direction, and wherein the touch panel further comprises a second capacitor including a first electrode connected to the second touch electrode and a second electrode connected to at least one of the auxiliary electrodes.

17. A display device comprising:

a display panel including sub-pixels;

a display panel driver configured to control the display panel;

a touch panel including a touch sensor including a plurality of touch electrodes and a charger including a plurality of charge electrodes; and a touch panel driver configured to provide a first charge voltage having a first phase to a first charge electrode among the charge electrodes in a first charge period, provide the first charge voltage to a second charge electrode among the charge electrodes in a second charge period, provide a second charge voltage having a second phase different from the first phase to a third charge electrode among the charge electrodes in the first charge period, and provide the second charge voltage to a fourth charge electrode among the charge electrodes in the second charge period, wherein a minimum distance between the second charge electrode and the fourth charge electrode is different from a minimum distance between the first charge electrode and the third charge electrode.

18. A method of driving a display device, the method comprising:

providing a first charge voltage having a first phase to N first charge electrodes among charge electrodes in a first charge period;

providing a second charge voltage having a second phase different from the first phase to a third charge electrode among the charge electrodes in the first charge period;

providing the first charge voltage to M (M is different from N) second charge electrode among the charge electrodes in a second charge period; and providing the second charge voltage to a fourth charge electrode among the charge electrodes in the second charge period, where N is a positive integer greater than or equal to 2, and M is a positive integer.

19. The method according to claim 18, wherein a minimum distance between the second charge electrodes and the fourth charge electrode is different from a minimum distance between the first charge electrodes and the third charge electrode.

20. The method according to claim 18, further comprising:

providing a touch driving signal to a touch sensor in a first touch period.

21. A display device comprising:

a display panel including sub-pixels;

a display panel driver configured to control the display panel;

a touch panel including a touch sensor including a plurality of touch electrodes and a charger including a plurality of charge electrodes; and a touch panel driver configured to provide a first charge voltage having a first phase to a first charge electrode among the charge electrodes in a first charge period, provide the first charge voltage to a second charge electrode among the charge electrodes in a second charge period, provide a second charge voltage having a second phase different from the first phase to a third charge electrode among the charge electrodes in the first charge period, and provide the second charge voltage to a fourth charge electrode among the charge electrodes in the second charge period, wherein the charger comprises:

a charge area including the charge electrodes;

a peripheral area disposed adjacent to the charge area; and a dummy charge electrode disposed in the peripheral area.

* * * * *